(12) United States Patent
Lutter et al.

(10) Patent No.: US 11,983,316 B2
(45) Date of Patent: May 14, 2024

(54) METHOD AND DEVICE FOR MANAGING ATTENTION ACCUMULATORS

(71) Applicant: Apple Inc., Cupertino, CA (US)

(72) Inventors: Gregory Lutter, Boulder Creek, CA (US); Bryce L. Schmidtchen, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/096,090

(22) Filed: Jan. 12, 2023

(65) Prior Publication Data

US 2023/0244308 A1    Aug. 3, 2023

Related U.S. Application Data

(60) Provisional application No. 63/300,941, filed on Jan. 19, 2022.

(51) Int. Cl.
*G06F 3/01* (2006.01)
*G06F 3/04842* (2022.01)

(52) U.S. Cl.
CPC .......... *G06F 3/013* (2013.01); *G06F 3/04842* (2013.01)

(58) Field of Classification Search
CPC ............................. G06F 3/013; G06F 3/04842
See application file for complete search history.

(56) References Cited

U.S. PATENT DOCUMENTS

| 10,182,720 | B2 | 1/2019 | Hennessey et al. |
| 10,401,960 | B2 | 9/2019 | Khalid et al. |
| 10,885,874 | B2 | 1/2021 | Day et al. |
| 2020/0272231 | A1 | 8/2020 | Klein et al. |

*Primary Examiner* — Nhat Huy T Nguyen
(74) *Attorney, Agent, or Firm* — Fernando & Partners, LLP

(57) ABSTRACT

In one implementation, a method is performed for selecting a UI element with eye tracking-based attention accumulators. The method includes: while a first UI element is currently selected, detecting a gaze direction directed to a second UI element; in response to detecting the gaze direction directed to the second UI element, decreasing a first attention accumulator value associated with the first UI element and increasing a second attention accumulator value associated with the second UI element; in accordance with a determination that the second attention accumulator value exceeds the first attention accumulator value, deselecting the first UI element and selecting the second UI element; and in accordance with a determination that the second attention accumulator value does not exceed the first attention accumulator value, maintaining selection of the first UI element.

21 Claims, 25 Drawing Sheets

700

710 — While a first user interface (UI) element is currently selected, detect a first gaze direction directed to a second UI element different from the first UI element

712 — The first and second UI elements correspond to one of a selectable affordance, a selectable button, an interactive UI element, a notification, or an extended reality (XR) object

720 — In response to detecting the first gaze direction directed to a second UI element, decrease a first attention accumulator value associated with the first UI element and increasing a second attention accumulator value associated with the second UI element based on a length of time that the first gaze direction is directed to the second UI element

722 — The first and second attention accumulator values are stored in a rank-sorted list of attention accumulator values (A)

730 — In accordance with a determination that the second attention accumulator value associated with the second UI element does not exceed the first attention accumulator value associated with the first UI element, maintain selection of the first UI element

732 — Maintain selection of the first UI element further in accordance with a determination that the first attention accumulator value associated with the first UI element does not breach or fall below a second (deselection) threshold value

Figure 7A

METHOD AND DEVICE FOR MANAGING ATTENTION ACCUMULATORS

CROSS-REFERENCE TO RELATED APPLICATIONS

This application is claims priority to U.S. Provisional Patent App. No. 63/300,941, filed on Jan. 19, 2022, which is hereby incorporated by reference in its entirety.

TECHNICAL FIELD

The present disclosure generally relates to selecting user interface (UI) elements and, in particular, to systems, devices, and methods for selecting UI elements with eye tracking-based attention accumulators.

BACKGROUND

In general, eye tracking may be noisy and/or inaccurate. Dwell timers may be used to select a UI element with eye tracking inputs. However, the usage of dwell timers to switch between UI elements may cause additional user experience (UX) problems such as discontinuities or jumpiness.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 7A-7C illustrate a flowchart representation of a method of selecting a UI element with eye tracking-based attention accumulators in accordance with some implementations.

Figure 1:
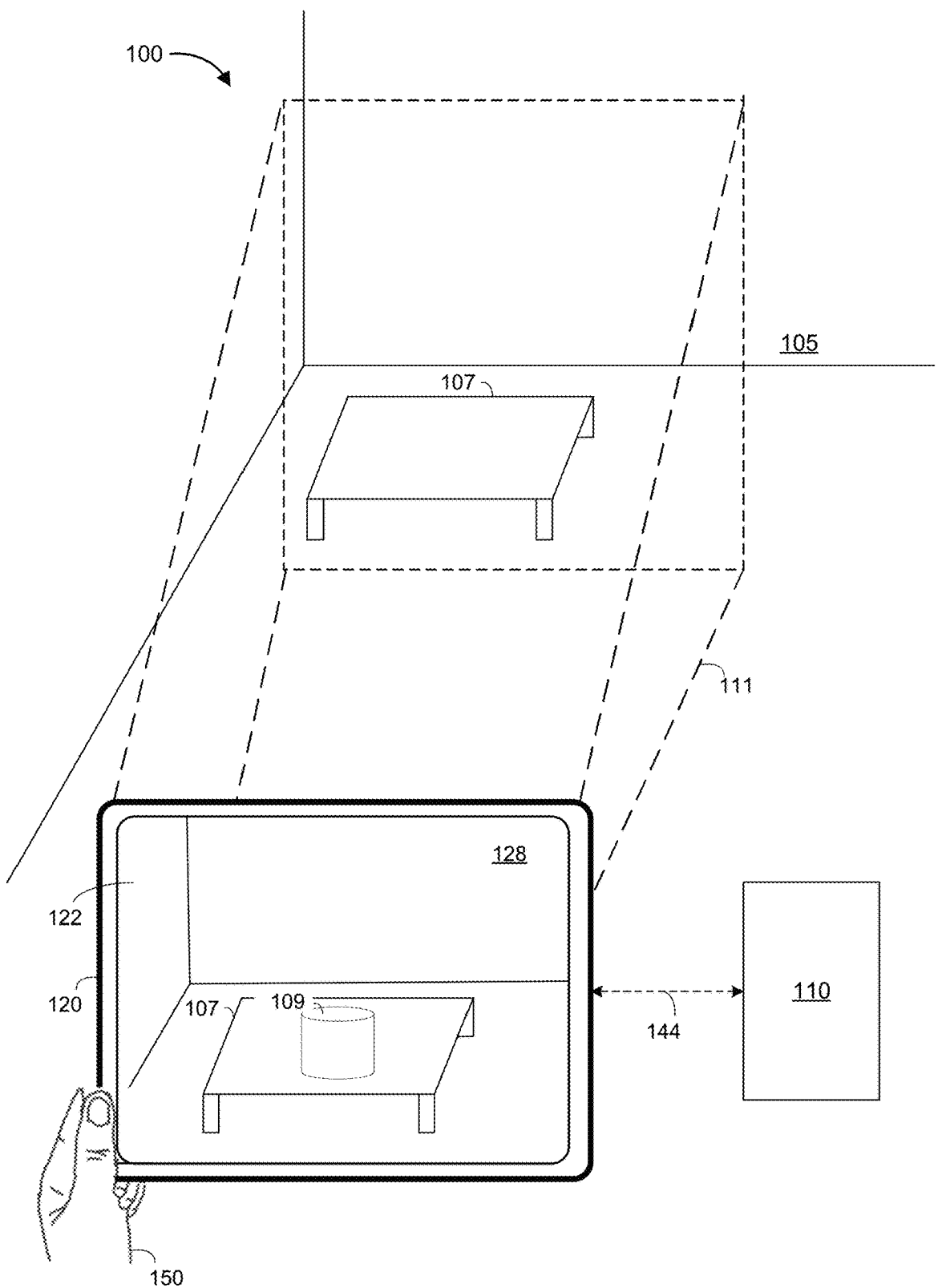
FIG. 1 is a block diagram of an example operating architecture in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

SUMMARY

Various implementations disclosed herein include devices, systems, and methods for selecting a UI element with eye tracking-based attention accumulators. According to some implementations, the method is performed at a computing system including non-transitory memory and one or more processors, wherein the computing system is communicatively coupled to a display device and one or more input devices. The method includes: while a first user interface (UI) element is currently selected, detecting a first gaze direction directed to a second UI element different from the first UI element; in response to detecting the first gaze direction directed to the second UI element, decreasing a first attention accumulator value associated with the first UI element and increasing a second attention accumulator value associated with the second UI element based on a length of time that the first gaze direction is directed to the second UI element; in accordance with a determination that the second attention accumulator value associated with the second UI element exceeds the first attention accumulator value associated with the first UI element, deselecting the first UI element and selecting the second UI element; and in accordance with a determination that the second attention accumulator value associated with the second UI element does not exceed the first attention accumulator value associated with the first UI element, maintaining selection of the first UI element.

In accordance with some implementations, an electronic device includes one or more displays, one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more displays, one or more processors, a non-transitory memory, and means for performing or causing performance of any of the methods described herein.

In accordance with some implementations, a computing system includes one or more processors, non-transitory memory, an interface for communicating with a display device and one or more input devices, and one or more programs; the one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of a computing system with an interface for communicating with a display device and one or more input devices, cause the computing system to perform or cause performance of the operations of any of the methods described herein. In accordance with some implementations, a computing system includes one or more processors, non-transitory memory, an interface for communicating with a display device and one or more input devices, and means for performing or causing performance of the operations of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

FIG. 1 is a block diagram of an example operating architecture 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 100 includes an optional controller 110 and an electronic device 120 (e.g., a tablet, mobile phone, laptop, near-eye system, wearable computing device, or the like).

In some implementations, the controller 110 is configured to manage and coordinate an XR experience (sometimes also referred to herein as a "XR environment" or a "virtual environment" or a "graphical environment") for a user 150 and optionally other users. In some implementations, the controller 110 includes a suitable combination of software, firmware, and/or hardware. The controller 110 is described in greater detail below with respect to FIG. 2. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In some implementations, the functions of the controller 110 are provided by the electronic device 120. As such, in some implementations, the components of the controller 110 are integrated into the electronic device 120.

In some implementations, the electronic device 120 is configured to present audio and/or video (A/V) content to the user 150. In some implementations, the electronic device 120 is configured to present a user interface (UI) and/or an XR environment 128 to the user 150. In some implementations, the electronic device 120 includes a suitable combination of software, firmware, and/or hardware. The electronic device 120 is described in greater detail below with respect to FIG. 3.

According to some implementations, the electronic device 120 presents an XR experience to the user 150 while the user 150 is physically present within a physical environment 105 that includes a table 107 and a portrait 523 within the field-of-view (FOV) 111 of the electronic device 120. As such, in some implementations, the user 150 holds the electronic device 120 in his/her hand(s). In some implementations, while presenting the XR experience, the electronic device 120 is configured to present XR content (sometimes also referred to herein as "graphical content" or "virtual content"), including an XR cylinder 109, and to enable video pass-through of the physical environment 105 (e.g., including the table 107 and the portrait 523 (or representations thereof)) on a display 122. For example, the XR environment 128, including the XR cylinder 109, is volumetric or three-dimensional (3D).

In one example, the XR cylinder 109 corresponds to head/display-locked content such that the XR cylinder 109 remains displayed at the same location on the display 122 as the FOV 111 changes due to translational and/or rotational movement of the electronic device 120. As another example, the XR cylinder 109 corresponds to world/object-locked content such that the XR cylinder 109 remains displayed at its origin location as the FOV 111 changes due to translational and/or rotational movement of the electronic device 120. As such, in this example, if the FOV 111 does not include the origin location, the displayed XR environment 128 will not include the XR cylinder 109. As another example, the XR cylinder 109 corresponds to body-locked content such that it remains at a positional and rotational offset from the body of the user 150. In some examples, the electronic device 120 corresponds to a near-eye system, mobile phone, tablet, laptop, wearable computing device, or the like.

In some implementations, the display 122 corresponds to an additive display that enables optical see-through of the physical environment 105 including the table 107 and the portrait 523. For example, the display 122 corresponds to a transparent lens, and the electronic device 120 corresponds to a pair of glasses worn by the user 150. As such, in some implementations, the electronic device 120 presents a user interface by projecting the XR content (e.g., the XR cylinder 109) onto the additive display, which is, in turn, overlaid on the physical environment 105 from the perspective of the user 150. In some implementations, the electronic device 120 presents the user interface by displaying the XR content (e.g., the XR cylinder 109) on the additive display, which is, in turn, overlaid on the physical environment 105 from the perspective of the user 150.

In some implementations, the user 150 wears the electronic device 120 such as a near-eye system. As such, the electronic device 120 includes one or more displays provided to display the XR content (e.g., a single display or one for each eye). For example, the electronic device 120 encloses the FOV of the user 150. In such implementations, the electronic device 120 presents the XR environment 128 by displaying data corresponding to the XR environment 128 on the one or more displays or by projecting data corresponding to the XR environment 128 onto the retinas of the user 150.

In some implementations, the electronic device 120 includes an integrated display (e.g., a built-in display) that displays the XR environment 128. In some implementations, the electronic device 120 includes a head-mountable enclosure. In various implementations, the head-mountable enclosure includes an attachment region to which another device with a display can be attached. For example, in some implementations, the electronic device 120 can be attached to the head-mountable enclosure. In various implementations, the head-mountable enclosure is shaped to form a receptacle for receiving another device that includes a display (e.g., the electronic device 120). For example, in some implementations, the electronic device 120 slides/snaps into or otherwise attaches to the head-mountable enclosure. In some implementations, the display of the device attached to the head-mountable enclosure presents (e.g., displays) the XR environment 128. In some implementations, the electronic device 120 is replaced with an XR chamber, enclosure, or room configured to present XR content in which the user 150 does not wear the electronic device 120.

In some implementations, the controller 110 and/or the electronic device 120 cause an XR representation of the user 150 to move within the XR environment 128 based on movement information (e.g., body pose data, eye tracking data, hand/limb/finger/extremity tracking data, etc.) from the electronic device 120 and/or optional remote input devices within the physical environment 105. In some implementations, the optional remote input devices correspond to fixed or movable sensory equipment within the physical environment 105 (e.g., image sensors, depth sensors, infrared (IR) sensors, event cameras, microphones, etc.). In some implementations, each of the remote input devices is configured to collect/capture input data and provide the input data to the controller 110 and/or the electronic device 120 while the user 150 is physically within the physical environment 105. In some implementations, the remote input devices include microphones, and the input data includes audio data associated with the user 150 (e.g., speech samples). In some implementations, the remote input devices include image sensors (e.g., cameras), and the input data includes images of the user 150. In some implementations, the input data characterizes body poses of the user 150 at different times. In some implementations, the input data characterizes head poses of the user 150 at different times. In some implementations, the input data characterizes hand tracking information associated with the hands of the user 150 at different times. In some implementations, the input data characterizes the velocity and/or acceleration of body parts of the user 150 such as his/her hands. In some implementations, the input data indicates joint positions and/or joint orientations of the user 150. In some implementations, the remote input devices include feedback devices such as speakers, lights, or the like.

Figure 2:
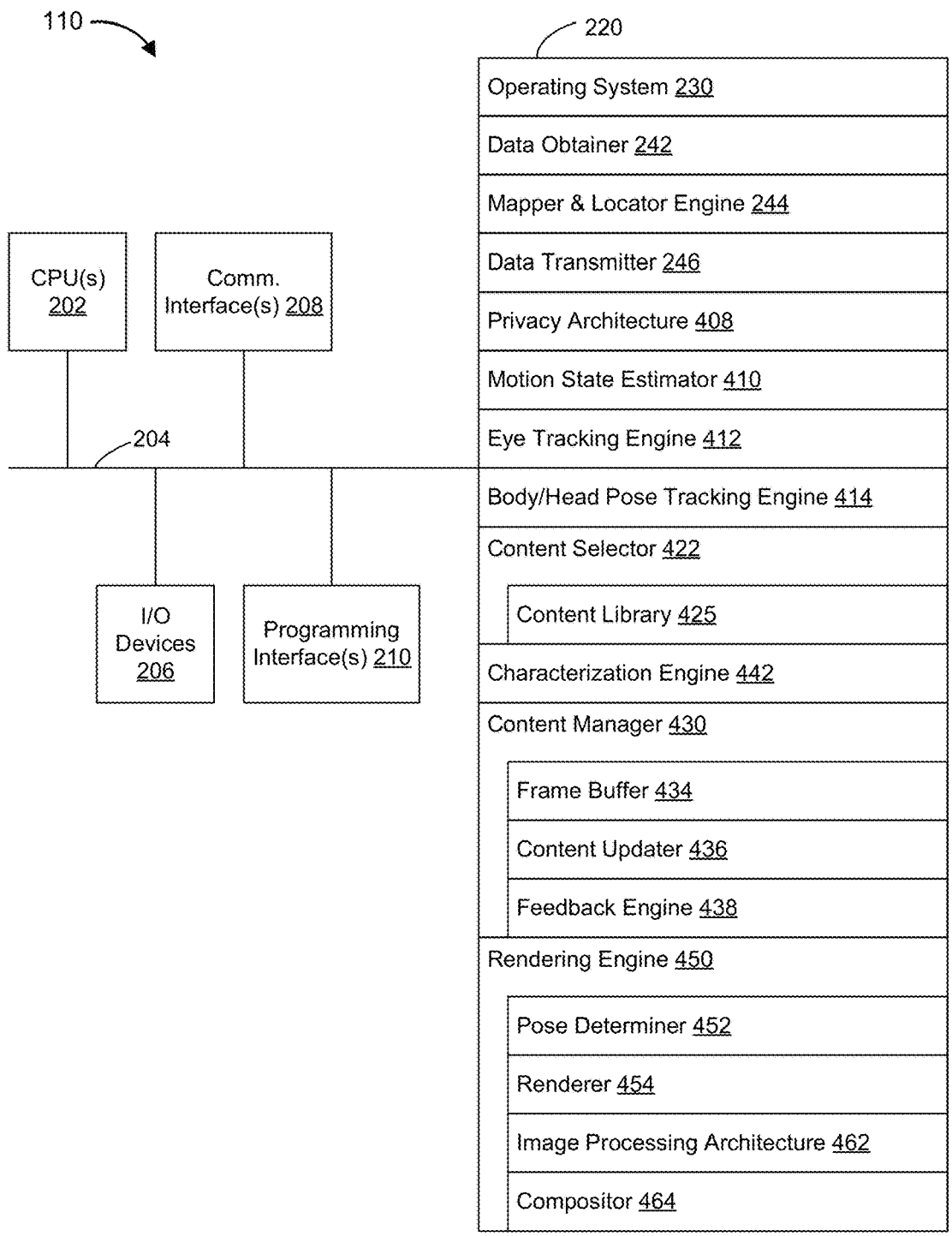
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a touchscreen, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof described below with respect to FIG. 2.

An operating system 230 includes procedures for handling various basic system services and for performing hardware dependent tasks.

In some implementations, a data obtainer 242 is configured to obtain data (e.g., captured image frames of the physical environment 105, presentation data, input data, user interaction data, camera pose tracking information, eye tracking information, head/body pose tracking information, hand/limb/finger/extremity tracking information, sensor data, location data, etc.) from at least one of the I/O devices 206 of the controller 110, the I/O devices and sensors 306 of the electronic device 120, and the optional remote input devices. To that end, in various implementations, the data obtainer 242 includes instructions and/or logic therefor, and heuristics and metadata therefor.

In some implementations, a mapper and locator engine 244 is configured to map the physical environment 105 and to track the position/location of at least the electronic device 120 or the user 150 with respect to the physical environment 105. To that end, in various implementations, the mapper and locator engine 244 includes instructions and/or logic therefor, and heuristics and metadata therefor.

In some implementations, a data transmitter 246 is configured to transmit data (e.g., presentation data such as rendered image frames associated with the XR environment, location data, etc.) to at least the electronic device 120 and optionally one or more other devices. To that end, in various implementations, the data transmitter 246 includes instructions and/or logic therefor, and heuristics and metadata therefor.

In some implementations, a privacy architecture 408 is configured to ingest data and filter user information and/or identifying information within the data based on one or more privacy filters. The privacy architecture 408 is described in more detail below with reference to FIG. 4A. To that end, in various implementations, the privacy architecture 408 includes instructions and/or logic therefor, and heuristics and metadata therefor.

In some implementations, a motion state estimator 410 is configured to obtain (e.g., receive, retrieve, or determine/generate) a motion state vector 411 associated with the electronic device 120 (and the user 150) (e.g., including a current motion state associated with the electronic device 120) based on input data and update the motion state vector 411 over time. For example, as shown in FIG. 4B, the motion state vector 411 includes a motion state descriptor 472 for the electronic device 120 (e.g., stationary, in-motion, walking, running, cycling, operating or riding in an automobile car, operating or riding in a boat, operating or riding in a bus, operating or riding in a train, operating or riding in an aircraft, or the like), translational movement values 474 associated with the electronic device 120 (e.g., a heading, a velocity value, an acceleration value, etc.), angular movement values 476 associated with the electronic device 120 (e.g., an angular velocity value, an angular acceleration value, and/or the like for each of the pitch, roll, and yaw dimensions), and/or the like. The motion state estimator 410 is described in more detail below with reference to FIG. 4A. To that end, in various implementations, the motion state estimator 410 includes instructions and/or logic therefor, and heuristics and metadata therefor.

In some implementations, an eye tracking engine 412 is configured to obtain (e.g., receive, retrieve, or determine/generate) an eye tracking vector 413 as shown in FIG. 4B (e.g., with a gaze direction) based on the input data and update the eye tracking vector 413 over time. For example, the gaze direction indicates a point (e.g., associated with x, y, and z coordinates relative to the physical environment 105 or the world-at-large), a physical object, or a region of interest (ROI) in the physical environment 105 at which the user 150 is currently looking. As another example, the gaze direction indicates a point (e.g., associated with x, y, and z coordinates relative to the XR environment 128), an XR object, or a ROI in the XR environment 128 at which the user 150 is currently looking. The eye tracking engine 412 is described in more detail below with reference to FIG. 4A. To that end, in various implementations, the eye tracking engine 412 includes instructions and/or logic therefor, and heuristics and metadata therefor.

In some implementations, a body/head pose tracking engine 414 is configured to obtain (e.g., receive, retrieve, or determine/generate) a pose characterization vector 415 based on the input data and update the pose characterization vector 415 over time. For example, as shown in FIG. 4B, the pose characterization vector 415 includes a head pose descriptor 492A (e.g., upward, downward, neutral, etc.), translational values 492B for the head pose, rotational values 492C for the head pose, a body pose descriptor 494A (e.g., standing, sitting, prone, etc.), translational values 494B for body sections/extremities/limbs/joints, rotational values 494C for the body sections/extremities/limbs/joints, and/or the like. The body/head pose tracking engine 414 is described in more detail below with reference to FIG. 4A. To that end, in various implementations, the body/head pose tracking engine 414 includes instructions and/or logic therefor, and heuristics and metadata therefor. In some implementations, the motion state estimator 410, the eye tracking engine 412, and the body/head pose tracking engine 414 may be located on the electronic device 120 in addition to or in place of the controller 110.

In some implementations, a content selector 422 is configured to select XR content (sometimes also referred to herein as "graphical content" or "virtual content") from a content library 425 based on one or more user requests and/or inputs (e.g., a voice command, a selection from a user interface (UI) menu of XR content items or virtual agents (VAs), and/or the like). The content selector 422 is described in more detail below with reference to FIG. 4A. To that end, in various implementations, the content selector 422 includes instructions and/or logic therefor, and heuristics and metadata therefor.

In some implementations, a content library 425 includes a plurality of content items such as audio/visual (A/V) content, virtual agents (VAs), and/or XR content, objects, items, scenery, etc. As one example, the XR content includes 3D reconstructions of user captured videos, movies, TV episodes, and/or other XR content. In some implementations, the content library 425 is pre-populated or manually authored by the user 150. In some implementations, the content library 425 is located local relative to the controller 110. In some implementations, the content library 425 is located remote from the controller 110 (e.g., at a remote server, a cloud server, or the like).

Figure 4A:
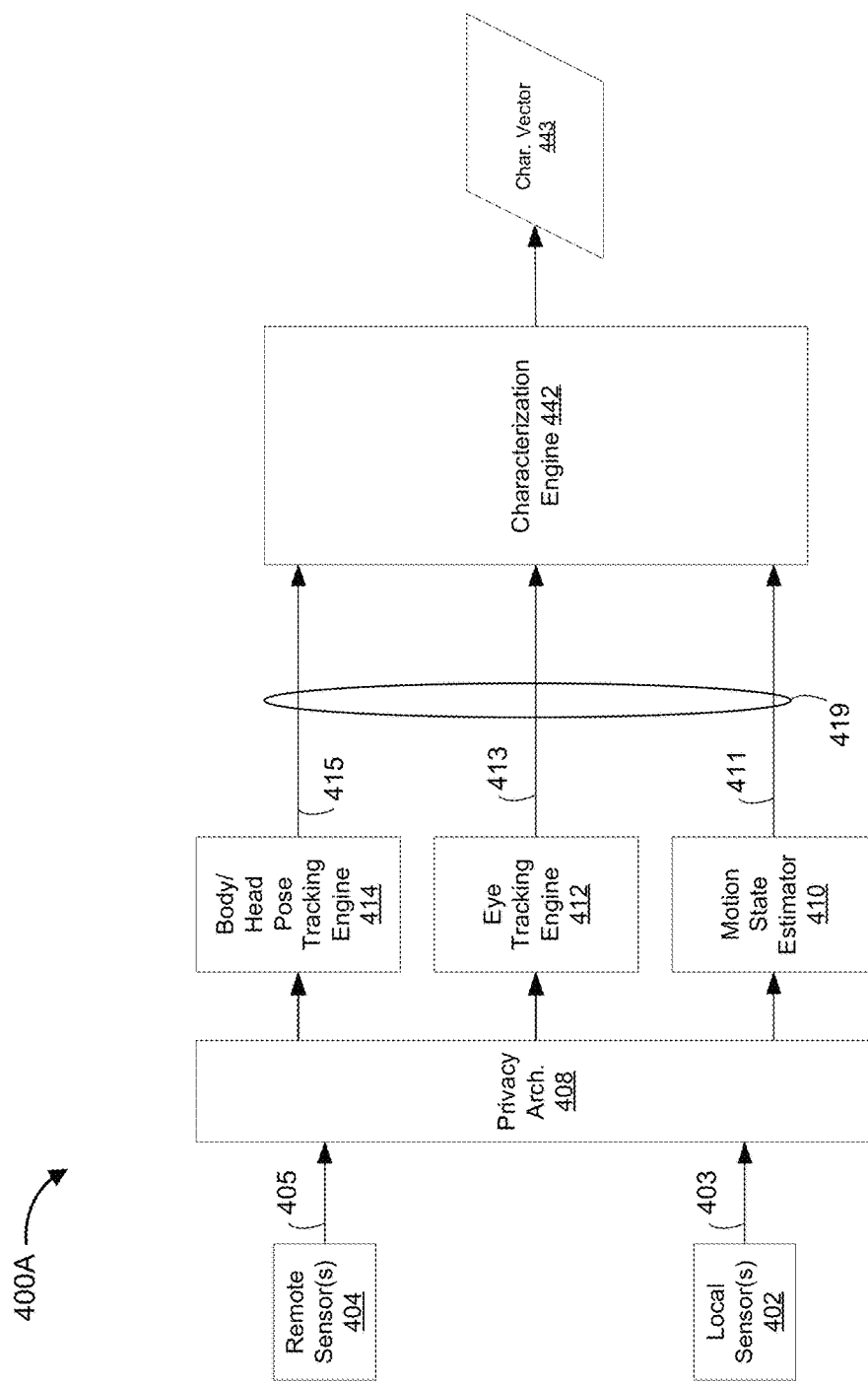
FIG. 4A is a block diagram of a first portion of an example content delivery architecture in accordance with some implementations.
Figure 4B:
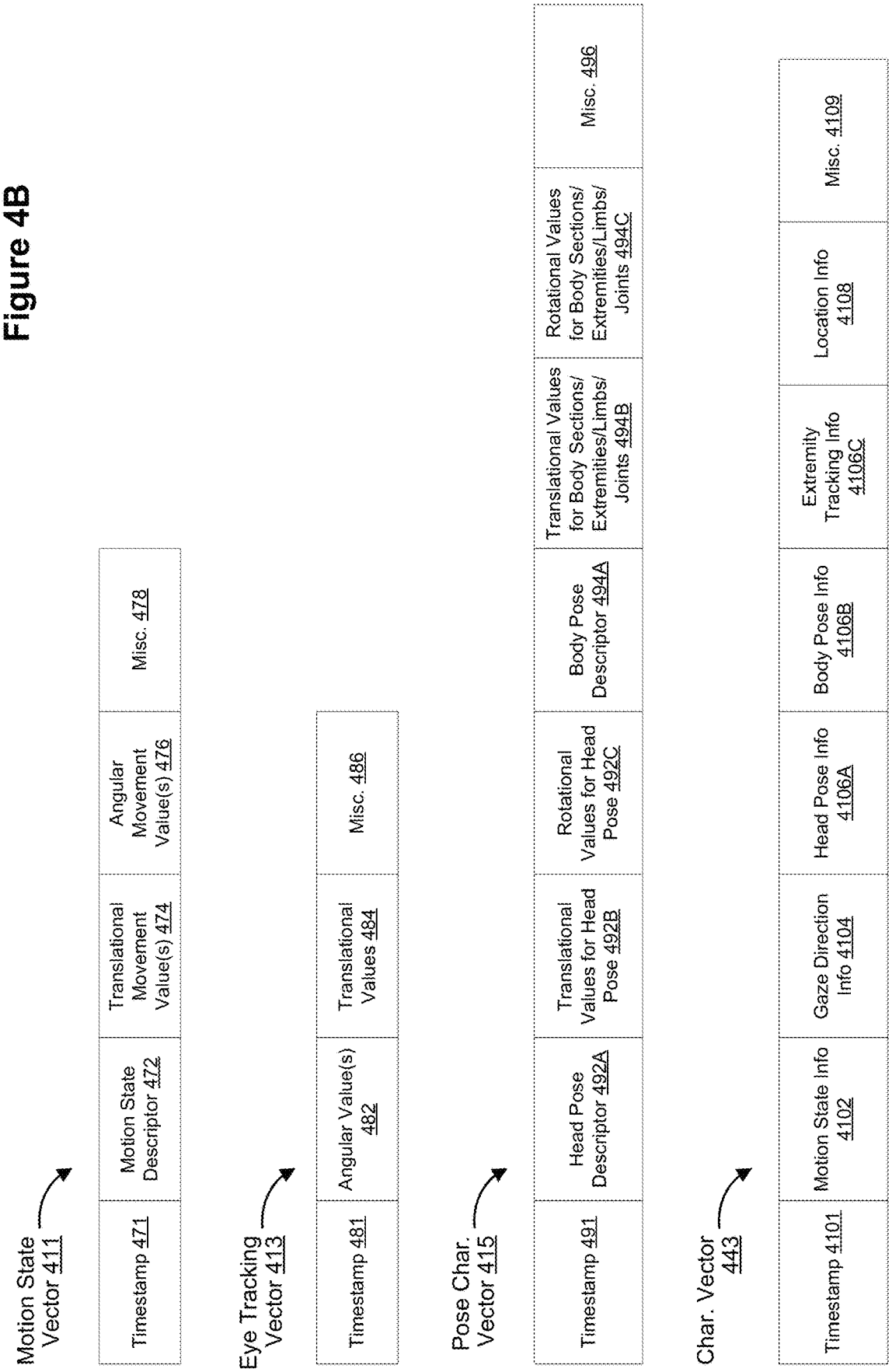
FIG. 4B illustrates example data structures in accordance with some implementations.

In some implementations, a characterization engine 442 is configured to determine/generate a characterization vector 443 based on at least one of the motion state vector 411, the eye tracking vector 413, and the pose characterization vector 415 as shown in FIG. 4A. In some implementations, the characterization engine 442 is also configured to update the pose characterization vector 443 over time. As shown in FIG. 4B, the characterization vector 443 includes motion state information 4102, gaze direction information 4104, head pose information 4106A, body pose information 4106B, extremity tracking information 4106C, location information 4108, and/or the like. The characterization engine 442 is described in more detail below with reference to FIG. 4A. To that end, in various implementations, the characterization engine 442 includes instructions and/or logic therefor, and heuristics and metadata therefor.

In some implementations, a content manager 430 is configured to manage and update the layout, setup, structure, and/or the like for the XR environment 128 including one or more of VA(s), XR content, one or more user interface (UI) elements associated with the XR content, and/or the like. The content manager 430 is described in more detail below with reference to FIG. 4C. To that end, in various implementations, the content manager 430 includes instructions and/or logic therefor, and heuristics and metadata therefor. In some implementations, the content manager 430 includes a frame buffer 434, a content updater 436, and a feedback engine 438. In some implementations, the frame buffer 434 includes XR content, a rendered image frame, and/or the like for one or more past instances and/or frames.

In some implementations, the content updater 436 is configured to modify the XR environment 128 over time based on translational or rotational movement of the electronic device 120 or physical objects within the physical environment 105, user inputs (e.g., a change in context, hand/extremity tracking inputs, eye tracking inputs, touch inputs, voice commands, modification/manipulation inputs with the physical object, and/or the like), and/or the like. To that end, in various implementations, the content updater 436 includes instructions and/or logic therefor, and heuristics and metadata therefor.

In some implementations, the feedback engine 438 is configured to generate sensory feedback (e.g., visual feedback such as text or lighting changes, audio feedback, haptic feedback, etc.) associated with the XR environment 128. To that end, in various implementations, the feedback engine 438 includes instructions and/or logic therefor, and heuristics and metadata therefor.

In some implementations, a rendering engine 450 is configured to render an XR environment 128 (sometimes also referred to herein as a "graphical environment" or "virtual environment") or image frame associated therewith as well as the VA(s), XR content, one or more UI elements associated with the XR content, and/or the like. To that end, in various implementations, the rendering engine 450 includes instructions and/or logic therefor, and heuristics and metadata therefor. In some implementations, the rendering engine 450 includes a pose determiner 452, a renderer 454, an optional image processing architecture 462, and an optional compositor 464. One of ordinary skill in the art will appreciate that the optional image processing architecture 462 and the optional compositor 464 may be present for video pass-through configurations but may be removed for fully VR or optical see-through configurations.

In some implementations, the pose determiner 452 is configured to determine a current camera pose of the electronic device 120 and/or the user 150 relative to the A/V content and/or XR content. The pose determiner 452 is described in more detail below with reference to FIG. 4A. To that end, in various implementations, the pose determiner 452 includes instructions and/or logic therefor, and heuristics and metadata therefor.

In some implementations, the renderer 454 is configured to render the A/V content and/or the XR content according to the current camera pose relative thereto. The renderer 454 is described in more detail below with reference to FIG. 4A. To that end, in various implementations, the renderer 454 includes instructions and/or logic therefor, and heuristics and metadata therefor.

In some implementations, the image processing architecture 462 is configured to obtain (e.g., receive, retrieve, or capture) an image stream including one or more images of the physical environment 105 from the current camera pose of the electronic device 120 and/or the user 150. In some implementations, the image processing architecture 462 is also configured to perform one or more image processing operations on the image stream such as warping, color correction, gamma correction, sharpening, noise reduction, white balance, and/or the like. The image processing architecture 462 is described in more detail below with reference to FIG. 4A. To that end, in various implementations, the image processing architecture 462 includes instructions and/or logic therefor, and heuristics and metadata therefor.

In some implementations, the compositor 464 is configured to composite the rendered A/V content and/or XR content with the processed image stream of the physical environment 105 from the image processing architecture 462 to produce rendered image frames of the XR environment 128 for display. The compositor 464 is described in more detail below with reference to FIG. 4A. To that end, in various implementations, the compositor 464 includes instructions and/or logic therefor, and heuristics and metadata therefor.

Although the data obtainer 242, the mapper and locator engine 244, the data transmitter 246, the privacy architecture 408, the motion state estimator 410, the eye tracking engine 412, the body/head pose tracking engine 414, the content selector 422, the content manager 430, the operation modality manager 440, and the rendering engine 450 are shown as residing on a single device (e.g., the controller 110), it should be understood that in other implementations, any combination of the data obtainer 242, the mapper and locator engine 244, the data transmitter 246, the privacy architecture 408, the motion state estimator 410, the eye tracking engine 412, the body/head pose tracking engine 414, the content selector 422, the content manager 430, the operation modality manager 440, and the rendering engine 450 may be located in separate computing devices.

In some implementations, the functions and/or components of the controller 110 are combined with or provided by the electronic device 120 shown below in FIG. 3. Moreover, FIG. 2 is intended more as a functional description of the various features which may be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
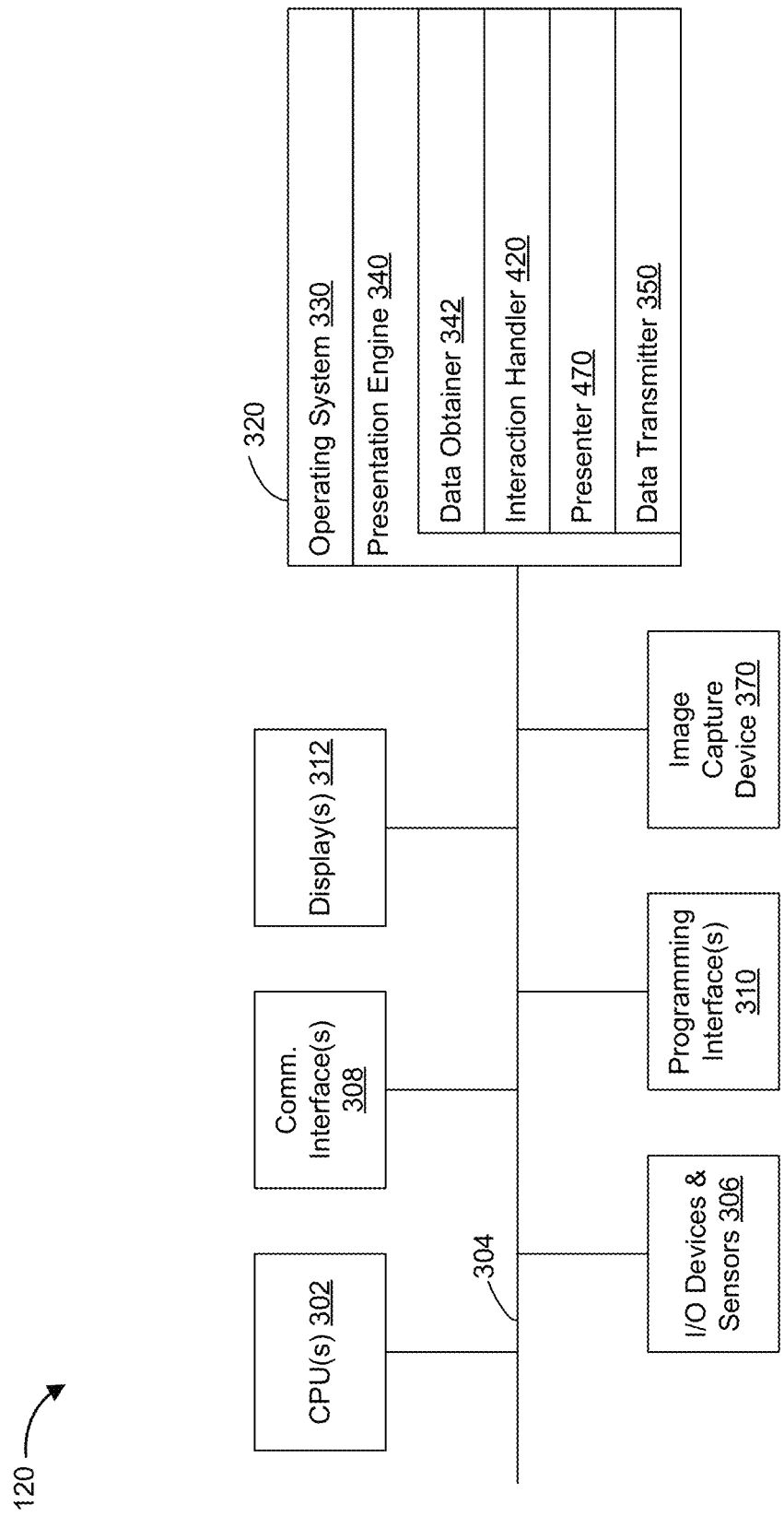
FIG. 3 is a block diagram of an example electronic device in accordance with some implementations.

FIG. 3 is a block diagram of an example of the electronic device 120 (e.g., a mobile phone, tablet, laptop, near-eye system, wearable computing device, or the like) in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more displays 312, an image capture device 370 (e.g., one or more optional interior- and/or exterior-facing image sensors), a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a magnetometer, a thermometer, one or more physiological sensors (e.g., blood pressure monitor, heart rate monitor, blood oximetry monitor, blood glucose monitor, etc.), one or more microphones, one or more speakers, a haptics engine, a heating and/or cooling unit, a skin shear engine, one or more depth sensors (e.g., structured light, time-of-flight, LiDAR, or the like), a localization and mapping engine, an eye tracking engine, a body/head pose tracking engine, a hand/limb/finger/extremity tracking engine, a camera pose tracking engine, and/or the like.

In some implementations, the one or more displays 312 are configured to present the XR environment to the user. In some implementations, the one or more displays 312 are also configured to present flat video content to the user (e.g., a 2-dimensional or "flat" AVI, FLV, WMV, MOV, MP4, or the like file associated with a TV episode or a movie, or live video pass-through of the physical environment 105). In some implementations, the one or more displays 312 correspond to touchscreen displays. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 312 correspond to diffractive, reflective, polarized, holographic, etc. waveguide displays. For example, the electronic device 120 includes a single display. In another example, the electronic device 120 includes a display for each eye of the user. In some implementations, the one or more displays 312 are capable of presenting AR and VR content. In some implementations, the one or more displays 312 are capable of presenting AR or VR content.

In some implementations, the image capture device 370 correspond to one or more RGB cameras (e.g., with a complementary metal-oxide-semiconductor (CMOS) image sensor or a charge-coupled device (CCD) image sensor), IR image sensors, event-based cameras, and/or the like. In some implementations, the image capture device 370 includes a lens assembly, a photodiode, and a front-end architecture. In some implementations, the image capture device 370 includes exterior-facing and/or interior-facing image sensors.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a presentation engine 340.

The operating system 330 includes procedures for handling various basic system services and for performing hardware dependent tasks. In some implementations, the presentation engine 340 is configured to present media items and/or XR content to the user via the one or more displays 312. To that end, in various implementations, the presentation engine 340 includes a data obtainer 342, an interaction handler 420, a presenter 470, and a data transmitter 350.

In some implementations, the data obtainer 342 is configured to obtain data (e.g., presentation data such as rendered image frames associated with the user interface or the XR environment, input data, user interaction data, head tracking information, camera pose tracking information, eye tracking information, hand/limb/finger/extremity tracking information, sensor data, location data, etc.) from at least one of the I/O devices and sensors 306 of the electronic device 120, the controller 110, and the remote input devices. To that end, in various implementations, the data obtainer 342 includes instructions and/or logic therefor, and heuristics and metadata therefor.

In some implementations, the interaction handler 420 is configured to detect user interactions (e.g., gestural inputs detected via hand/extremity tracking, eye gaze inputs detected via eye tracking, voice commands, etc.) with the presented A/V content and/or XR content. To that end, in various implementations, the interaction handler 420 includes instructions and/or logic therefor, and heuristics and metadata therefor.

In some implementations, the presenter 470 is configured to present and update A/V content and/or XR content (e.g., the rendered image frames associated with the user interface or the XR environment 128 including the VA(s), the XR content, one or more UI elements associated with the XR content, and/or the like) via the one or more displays 312. To that end, in various implementations, the presenter 470 includes instructions and/or logic therefor, and heuristics and metadata therefor.

In some implementations, the data transmitter 350 is configured to transmit data (e.g., presentation data, location data, user interaction data, head tracking information, camera pose tracking information, eye tracking information, hand/limb/finger/extremity tracking information, etc.) to at least the controller 110. To that end, in various implementations, the data transmitter 350 includes instructions and/or logic therefor, and heuristics and metadata therefor.

Although the data obtainer 342, the interaction handler 420, the presenter 470, and the data transmitter 350 are shown as residing on a single device (e.g., the electronic device 120), it should be understood that in other implementations, any combination of the data obtainer 342, the interaction handler 420, the presenter 470, and the data transmitter 350 may be located in separate computing devices.

Moreover, FIG. 3 is intended more as a functional description of the various features which may be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

FIG. 4A is a block diagram of a first portion 400A of an example content delivery architecture in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the content delivery architecture is included in a computing system such as the controller 110 shown in FIGS. 1 and 2; the electronic device 120 shown in FIGS. 1 and 3; and/or a suitable combination thereof.

As shown in FIG. 4A, one or more local sensors 402 of the controller 110, the electronic device 120, and/or a combination thereof obtain local sensor data 403 associated with the physical environment 105. For example, the local sensor data 403 includes images or a stream thereof of the physical environment 105, simultaneous location and mapping (SLAM) information for the physical environment 105 and the location of the electronic device 120 or the user 150 relative to the physical environment 105, ambient lighting information for the physical environment 105, ambient audio information for the physical environment 105, acoustic information for the physical environment 105, dimensional information for the physical environment 105, semantic labels for objects within the physical environment 105, and/or the like. In some implementations, the local sensor data 403 includes un-processed or post-processed information.

Similarly, as shown in FIG. 4A, one or more remote sensors 404 associated with the optional remote input devices within the physical environment 105 obtain remote sensor data 405 associated with the physical environment 105. For example, the remote sensor data 405 includes images or a stream thereof of the physical environment 105, SLAM information for the physical environment 105 and the location of the electronic device 120 or the user 150 relative to the physical environment 105, ambient lighting information for the physical environment 105, ambient audio information for the physical environment 105, acoustic information for the physical environment 105, dimensional information for the physical environment 105, semantic labels for objects within the physical environment 105, and/or the like. In some implementations, the remote sensor data 405 includes un-processed or post-processed information.

According to some implementations, the privacy architecture 408 ingests the local sensor data 403 and the remote sensor data 405. In some implementations, the privacy architecture 408 includes one or more privacy filters associated with user information and/or identifying information. In some implementations, the privacy architecture 408 includes an opt-in feature where the electronic device 120 informs the user 150 as to what user information and/or identifying information is being monitored and how the user information and/or the identifying information will be used. In some implementations, the privacy architecture 408 selectively prevents and/or limits the content delivery architecture 400A/400B or portions thereof from obtaining and/or transmitting the user information. To this end, the privacy architecture 408 receives user preferences and/or selections from the user 150 in response to prompting the user 150 for the same. In some implementations, the privacy architecture 408 prevents the content delivery architecture 400A/400B from obtaining and/or transmitting the user information unless and until the privacy architecture 408 obtains informed consent from the user 150. In some implementations, the privacy architecture 408 anonymizes (e.g., scrambles, obscures, encrypts, and/or the like) certain types of user information. For example, the privacy architecture 408 receives user inputs designating which types of user information the privacy architecture 408 anonymizes. As another example, the privacy architecture 408 anonymizes certain types of user information likely to include sensitive and/or identifying information, independent of user designation (e.g., automatically).

According to some implementations, the motion state estimator 410 obtains the local sensor data 403 and the remote sensor data 405 after it has been subjected to the privacy architecture 408. In some implementations, the motion state estimator 410 obtains (e.g., receives, retrieves, or determines/generates) a motion state vector 411 based on the input data and updates the motion state vector 411 over time.

FIG. 4B shows an example data structure for the motion state vector 411 in accordance with some implementations. As shown in FIG. 4B, the motion state vector 411 may correspond to an N-tuple characterization vector or characterization tensor that includes a timestamp 471 (e.g., the most recent time the motion state vector 411 was updated), a motion state descriptor 472 for the electronic device 120 (e.g., stationary, in-motion, car, boat, bus, train, plane, or the like), translational movement values 474 associated with the electronic device 120 (e.g., a heading, a displacement value, a velocity value, an acceleration value, a jerk value, etc.), angular movement values 476 associated with the electronic device 120 (e.g., an angular displacement value, an angular velocity value, an angular acceleration value, an angular jerk value, and/or the like for each of the pitch, roll, and yaw dimensions), and/or miscellaneous information 478. One of ordinary skill in the art will appreciate that the data structure for the motion state vector 411 in FIG. 4B is merely an example that may include different information portions in various other implementations and be structured in myriad ways in various other implementations.

According to some implementations, the eye tracking engine 412 obtains the local sensor data 403 and the remote sensor data 405 after it has been subjected to the privacy architecture 408. In some implementations, the eye tracking engine 412 obtains (e.g., receives, retrieves, or determines/generates) an eye tracking vector 413 based on the input data and updates the eye tracking vector 413 over time.

FIG. 4B shows an example data structure for the eye tracking vector 413 in accordance with some implementations. As shown in FIG. 4B, the eye tracking vector 413 may correspond to an N-tuple characterization vector or characterization tensor that includes a timestamp 481 (e.g., the most recent time the eye tracking vector 413 was updated), one or more angular values 482 for a current gaze direction (e.g., roll, pitch, and yaw values), one or more translational values 484 for the current gaze direction (e.g., x, y, and z values relative to the physical environment 105, the world-at-large, and/or the like), and/or miscellaneous information 486. One of ordinary skill in the art will appreciate that the data structure for the eye tracking vector 413 in FIG. 4B is merely an example that may include different information portions in various other implementations and be structured in myriad ways in various other implementations.

For example, the gaze direction indicates a point (e.g., associated with x, y, and z coordinates relative to the physical environment 105 or the world-at-large), a physical object, or a region of interest (ROI) in the physical environment 105 at which the user 150 is currently looking. As another example, the gaze direction indicates a point (e.g., associated with x, y, and z coordinates relative to the XR environment 128), an XR object, or a region of interest (ROI) in the XR environment 128 at which the user 150 is currently looking.

According to some implementations, the body/head pose tracking engine 414 obtains the local sensor data 403 and the remote sensor data 405 after it has been subjected to the privacy architecture 408. In some implementations, the body/head pose tracking engine 414 obtains (e.g., receives, retrieves, or determines/generates) a pose characterization vector 415 based on the input data and updates the pose characterization vector 415 over time.

FIG. 4B shows an example data structure for the pose characterization vector 415 in accordance with some implementations. As shown in FIG. 4B, the pose characterization vector 415 may correspond to an N-tuple characterization vector or characterization tensor that includes a timestamp 491 (e.g., the most recent time the pose characterization vector 415 was updated), a head pose descriptor 492A (e.g., upward, downward, neutral, etc.), translational values for the head pose 492B, rotational values for the head pose 492C, a body pose descriptor 494A (e.g., standing, sitting, prone, etc.), translational values for body sections/extremities/limbs/joints 494B, rotational values for the body sections/extremities/limbs/joints 494C, and/or miscellaneous information 496. In some implementations, the pose characterization vector 415 also includes information associated with finger/hand/extremity tracking. One of ordinary skill in the art will appreciate that the data structure for the pose characterization vector 415 in FIG. 4B is merely an example that may include different information portions in various other implementations and be structured in myriad ways in various other implementations. According to some implementations, the motion state vector 411, the eye tracking vector 413 and the pose characterization vector 415 are collectively referred to as an input vector 419.

According to some implementations, the characterization engine 442 obtains the motion state vector 411, the eye tracking vector 413 and the pose characterization vector 415. In some implementations, the characterization engine 442 obtains (e.g., receives, retrieves, or determines/generates) the characterization vector 443 based on the motion state vector 411, the eye tracking vector 413, and the pose characterization vector 415.

FIG. 4B shows an example data structure for the characterization vector 443 in accordance with some implementations. As shown in FIG. 4B, the characterization vector 443 may correspond to an N-tuple characterization vector or characterization tensor that includes a timestamp 4101 (e.g., the most recent time the characterization vector 443 was updated), motion state information 4102 (e.g., the motion state descriptor 472), gaze direction information 4104 (e.g., a function of the one or more angular values 482 and the one or more translational values 484 within the eye tracking vector 413), head pose information 4106A (e.g., the head pose descriptor 492A), body pose information 4106B (e.g., a function of the body pose descriptor 494A within the pose characterization vector 415), extremity tracking information 4106C (e.g., a function of the body pose descriptor 494A within the pose characterization vector 415 that is associated with extremities of the user 150 that are being tracked by the controller 110, the electronic device 120, and/or a combination thereof), location information 4108 (e.g., a household location such as a kitchen or living room, a vehicular location such as an automobile, plane, etc., and/or the like), and/or miscellaneous information 4109.

Figure 4C:
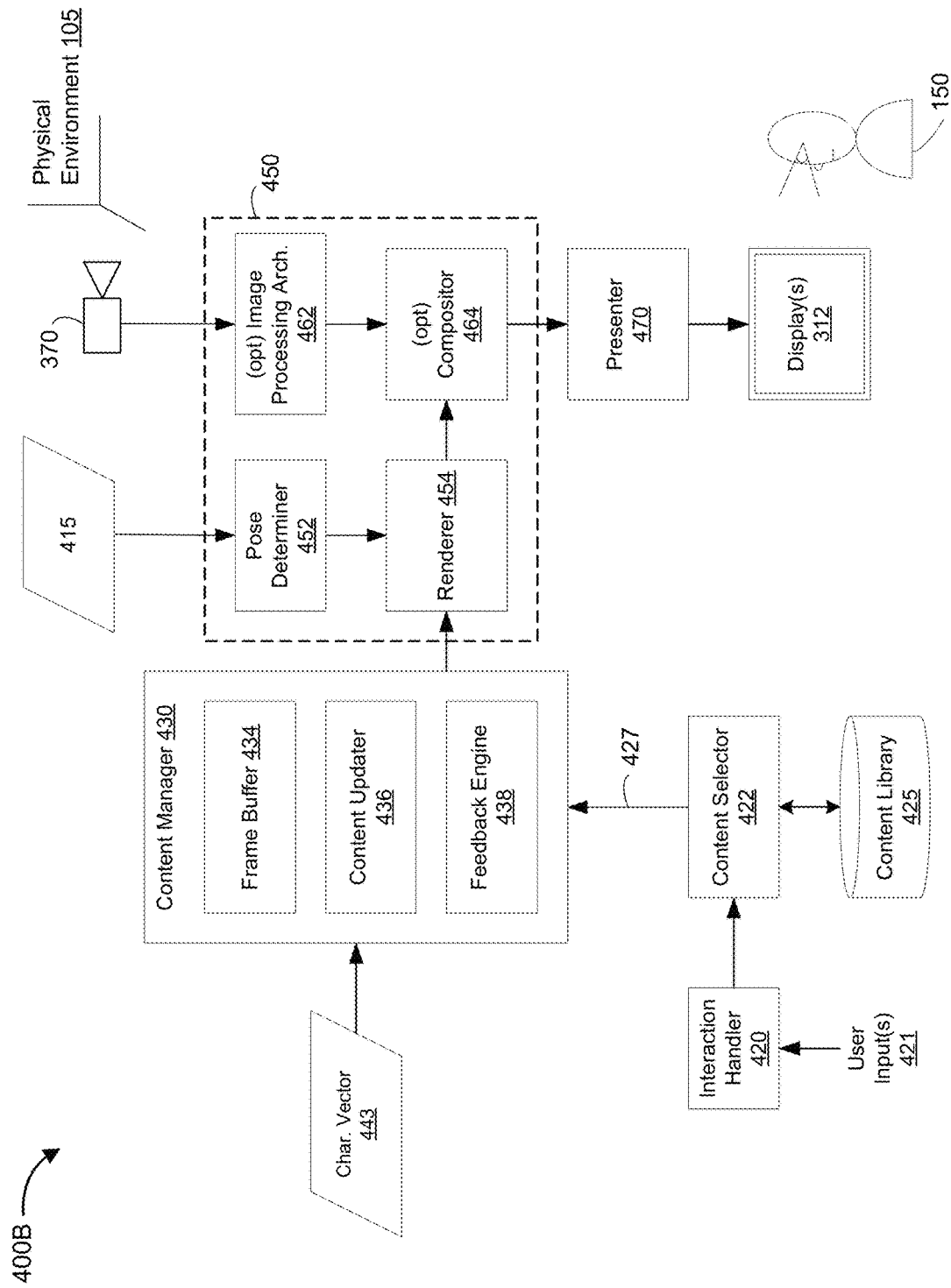
FIG. 4C is a block diagram of a second portion of the example content delivery architecture in accordance with some implementations.

FIG. 4C is a block diagram of a second portion 400B of the example content delivery architecture in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the content delivery architecture is included in a computing system such as the controller 110 shown in FIGS. 1 and 2; the electronic device 120 shown in FIGS. 1 and 3; and/or a suitable combination thereof. FIG. 4C is similar to and adapted from FIG. 4A. Therefore, similar reference numbers are used in FIGS. 4A and 4C. As such, only the differences between FIGS. 4A and 4C will be described below for the sake of brevity.

According to some implementations, the interaction handler 420 obtains (e.g., receives, retrieves, or detects) one or more user inputs 421 provided by the user 150 that are associated with selecting A/V content, one or more VAs, and/or XR content for presentation. For example, the one or more user inputs 421 correspond to a gestural input selecting XR content from a UI menu detected via hand/extremity tracking, an eye gaze input selecting XR content from the UI menu detected via eye tracking, a voice command selecting XR content from the UI menu detected via a microphone, and/or the like. In some implementations, the content selector 422 selects XR content 427 from the content library 425 based on one or more user inputs 421 (e.g., a voice command, a selection from a menu of XR content items, and/or the like).

In various implementations, the content manager 430 manages and updates the layout, setup, structure, and/or the like for the XR environment 128, including one or more of VAs, XR content, one or more UI elements associated with the XR content, and/or the like, based on the characterization vector 443, (optionally) the user inputs 421, and/or the like. To that end, the content manager 430 includes the frame buffer 434, the content updater 436, and the feedback engine 438.

In some implementations, the frame buffer 434 includes XR content, a rendered image frame, and/or the like for one or more past instances and/or frames. In some implementations, the content updater 436 modifies the XR environment 128 over time based on the characterization vector 443, the user inputs 421 associated with modifying and/or manipulating the XR content or VA(s), translational or rotational movement of objects within the physical environment 105, translational or rotational movement of the electronic device 120 (or the user 150), and/or the like. In some implementations, the feedback engine 438 generates sensory feedback (e.g., visual feedback such as text or lighting changes, audio feedback, haptic feedback, etc.) associated with the XR environment 128.

According to some implementations, the pose determiner 452 determines a current camera pose of the electronic device 120 and/or the user 150 relative to the XR environment 128 and/or the physical environment 105 based at least in part on the pose characterization vector 415. In some implementations, the renderer 454 renders the VA(s), the XR content 427, one or more UI elements associated with the XR content, and/or the like according to the current camera pose relative thereto.

According to some implementations, the optional image processing architecture 462 obtains an image stream from an image capture device 370 including one or more images of the physical environment 105 from the current camera pose of the electronic device 120 and/or the user 150. In some implementations, the image processing architecture 462 also performs one or more image processing operations on the image stream such as warping, color correction, gamma correction, sharpening, noise reduction, white balance, and/or the like. In some implementations, the optional compositor 464 composites the rendered XR content with the processed image stream of the physical environment 105 from the image processing architecture 462 to produce rendered image frames of the XR environment 128. In various implementations, the presenter 470 presents the rendered image frames of the XR environment 128 to the user 150 via the one or more displays 312. One of ordinary skill in the art will appreciate that the optional image processing architecture 462 and the optional compositor 464 may not be applicable for fully virtual environments (or optical see-through scenarios).

FIGS. 5A-5H illustrate a sequence of instances 500-570 for a content delivery scenario in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, the sequence of instances 500-570 are rendered and presented by a computing system such as the controller 110 shown in FIGS. 1 and 2; the electronic device 120 shown in FIGS. 1 and 3; and/or a suitable combination thereof.

As shown in FIGS. 5A-5H, the content delivery scenario includes a physical environment 105 and an XR environment 128 displayed on the display 122 of the electronic device 120 (e.g., associated with the user 150). The electronic device 120 presents the XR environment 128 to the user 150 while the user 150 is physically present within the physical environment 105 that includes a door 115, which is currently within the FOV 111 of an exterior-facing image sensor of the electronic device 120. As such, in some implementations, the user 150 holds the electronic device 120 in their hand(s) similar to the operating environment 100 in FIG. 1.

In other words, in some implementations, the electronic device 120 is configured to present XR content and to enable optical see-through or video pass-through of at least a portion of the physical environment 105 on the display 122 (e.g., the door 115). For example, the electronic device 120 corresponds to a mobile phone, tablet, laptop, near-eye system, wearable computing device, or the like.

Figure 5A:
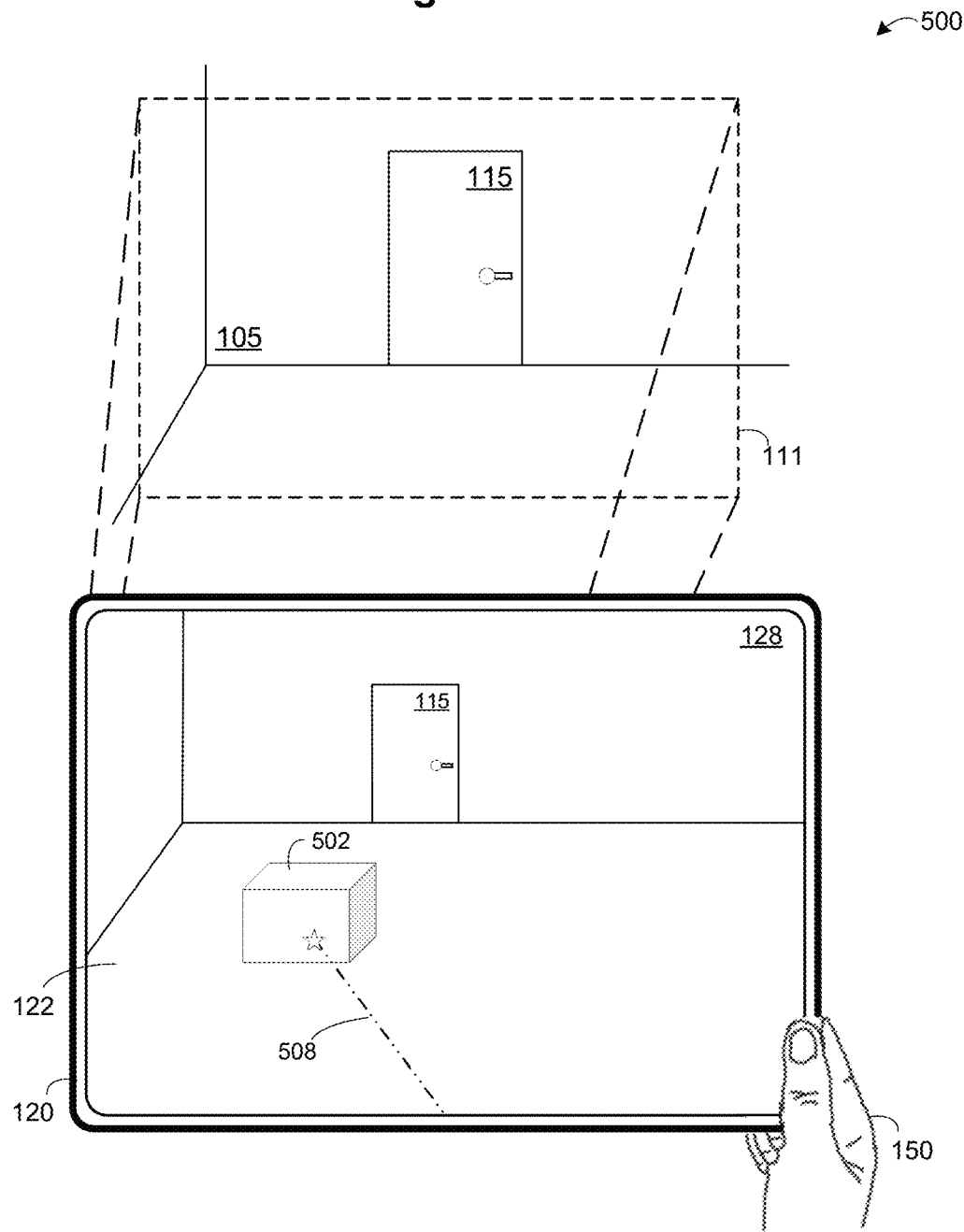
FIGS. 5A-5H illustrate a sequence of instances for a content delivery scenario in accordance with some implementations.

As shown in FIG. 5A, during the instance 500 (e.g., associated with time T0) of the content delivery scenario, the electronic device 120 presents an XR environment 128 including an XR object 502 (e.g., a volumetric cuboid). As shown in FIG. 5A, the XR environment 128 also includes a visualization 508 of the gaze direction or gaze vector of the user 150. According to various implementations, as described above with reference to FIG. 4A, the eye tracking engine 412 may determine and update the gaze direction or the gaze vector 413 over time. One of ordinary skill in the art will appreciate that the visualization 508 may be removed in various implementations or replaced with other forms or configurations in various other implementations. One of ordinary skill in the art will appreciate that the user 150 may interact with the XR object 502 within the XR environment 128 in various implementations based on various inputs (e.g., eye tracking inputs, hand/extremity-tracking inputs, voice commands, etc.) such as scaling, translating, rotating, annotating, modifying, etc. the XR object 502.

As shown in FIG. 5A, during the instance 500, the visualization 508 of the gaze direction of the user 150 is directed to the XR object 502. FIG. 5A also illustrates an attention accumulator 503 associated with the XR object 502 including a current value 511 at time T0, which corresponds to a length of time that the gaze direction of the user 150 has been directed to the XR object 502 as of T0 relative to a reference time window (e.g., the past X seconds, Y frames, Z cycles, etc.). As shown in FIG. 5A, the attention accumulator 503 associated with the XR object 502 also includes an increase indicator 509 indicating that the current value 511 for the attention accumulator 503 associated with the XR object 502 increased for the time T0. Moreover, in FIG. 5A, the attention accumulator 503 associated with the XR object 502 further includes a first (selection) threshold 501. One of ordinary skill in the art will appreciate that the visual representation of attention accumulator 503 may be removed in various implementations or replaced with other forms or configurations in various other implementations.

Figure 5B:
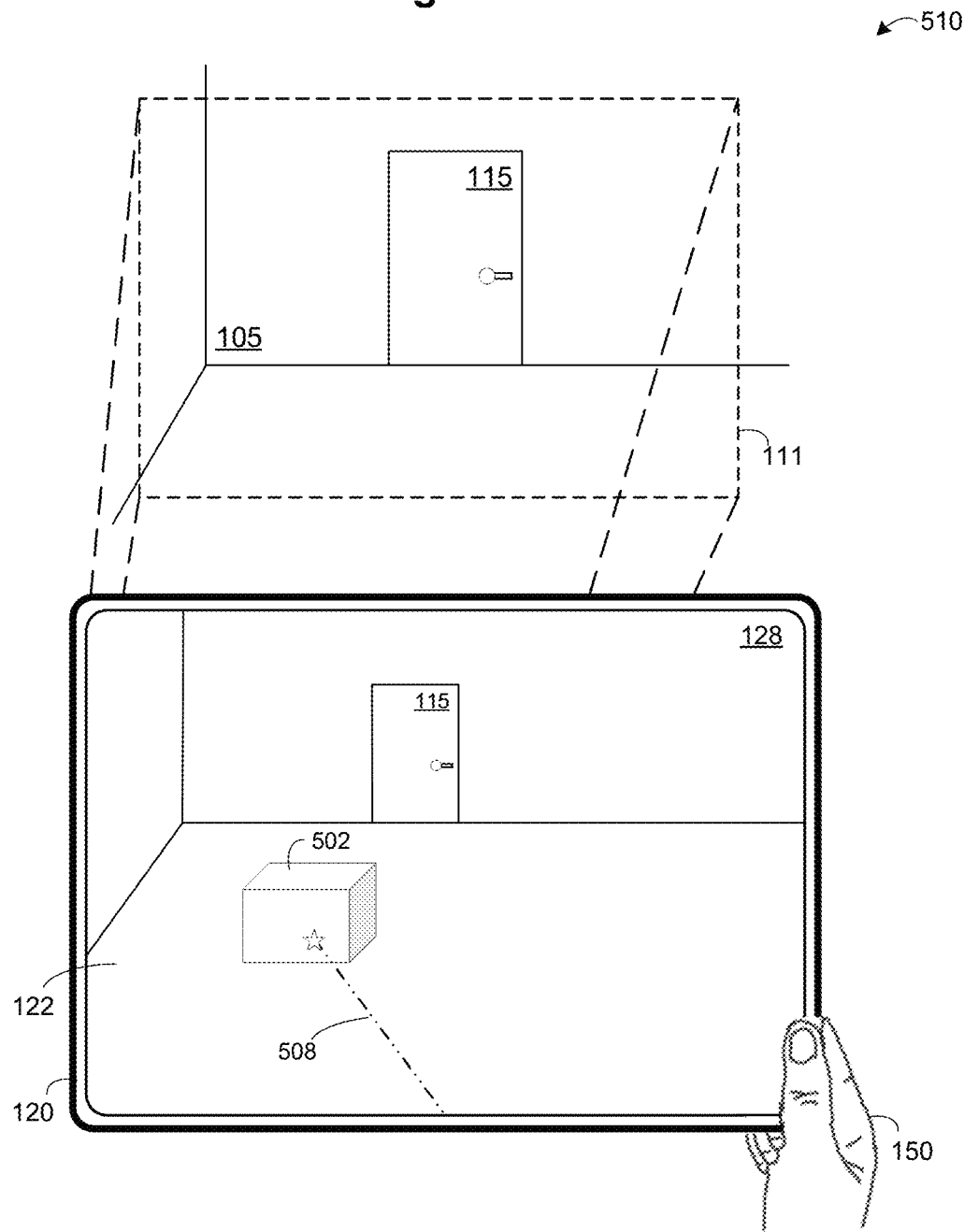
Figure 5C:
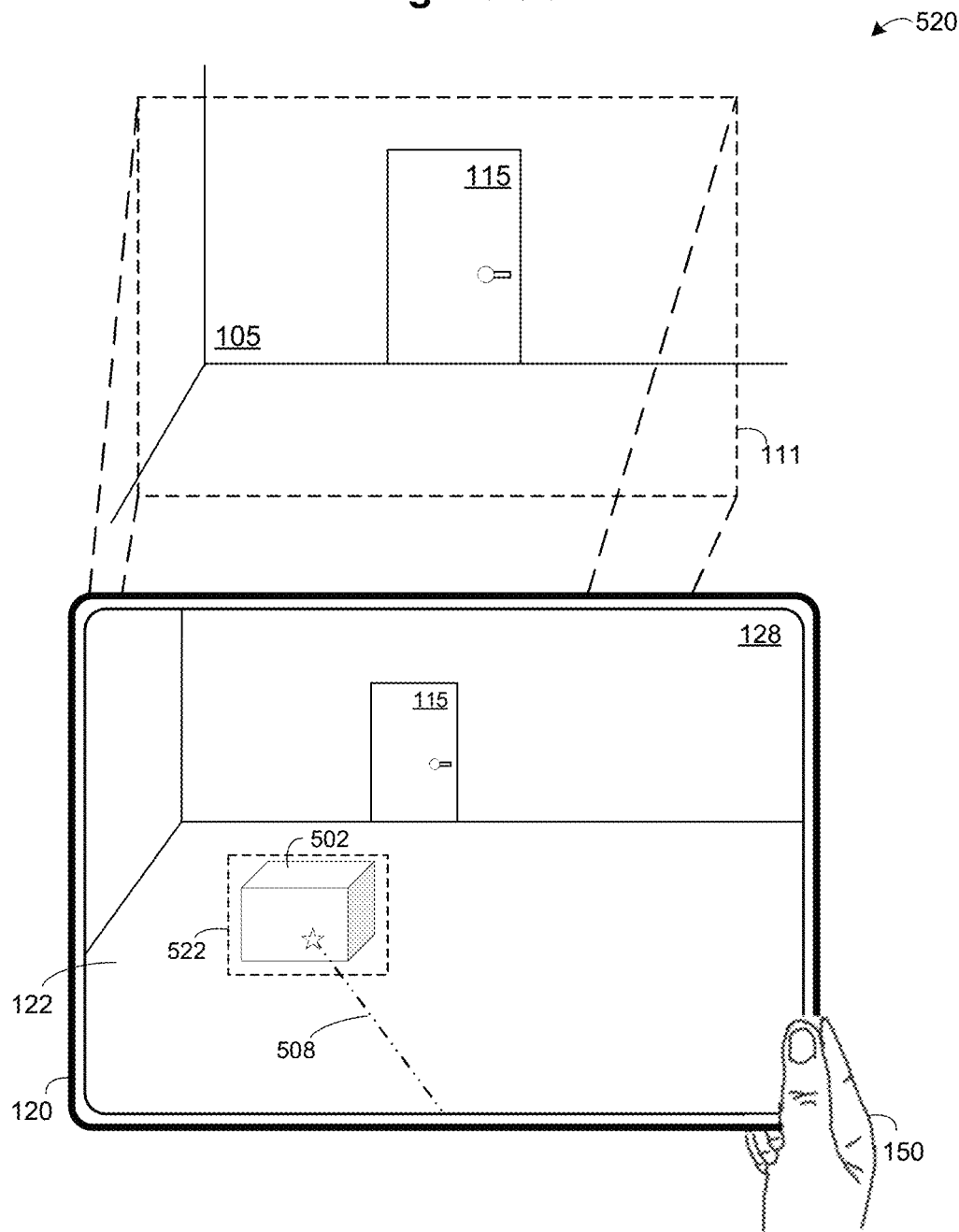
Figure 5C:
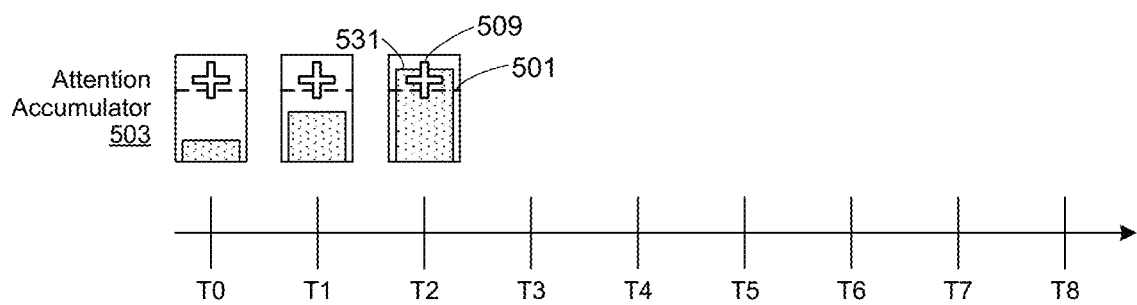

In some implementations, in accordance with a determination that the current value for the attention accumulator 503 associated with the XR object 502 breaches or exceeds the first (selection) threshold 501, the electronic device 120 selects the XR object 502 as shown in FIG. 5C and changes the appearance of the XR object 502 to indicate that it has been selected such as by presenting a border or frame 522 surrounding the XR object 502 as shown in FIG. 5C. In some implementations, in accordance with a determination that the current value for the attention accumulator 503 associated with the XR object 502 does not breach or exceed the first (selection) threshold 501, the electronic device 120 foregoes selecting the XR object 502 as shown in FIGS. 5A and 5B.

According to some implementations, the first (selection) threshold 501 corresponds to a predefined or deterministic value such as a predefined dwell timer. According to some implementations, the first (selection) threshold 501 corresponds to a non-deterministic value that is dynamically determined or selected based on eye tracking accuracy, current foreground application, XR object classification/type, UI element classification/type, user history, user preferences, and/or the like.

As shown in FIG. 5B, during the instance 510 (e.g., associated with time T1) of the content delivery scenario, the visualization 508 of the gaze direction of the user 150 remains directed to the XR object 502. FIG. 5B also illustrates the attention accumulator 503 associated with the XR object 502 including a current value 521 at time T1, which corresponds to a length of time that the gaze direction of the user 150 has been directed to the XR object 502 as of T1 relative to the reference time window (e.g., the past X seconds, Y frames, Z cycles, etc.). As shown in FIG. 5B, the attention accumulator 503 associated with the XR object 502 also includes the increase indicator 509 indicating that the current value 521 increased for the time T1 relative to the time T0. In FIG. 5B, the current value 521 does not breach or exceed the first (selection) threshold 501.

As shown in FIG. 5C, during the instance 520 (e.g., associated with time T2) of the content delivery scenario, the visualization 508 of the gaze direction of the user 150 remains directed to the XR object 502. FIG. 5C also illustrates the attention accumulator 503 associated with the XR object 502 including a current value 531 at time T2, which corresponds to a length of time that the gaze direction of the user 150 has been directed to the XR object 502 as of T2 relative to the reference time window (e.g., the past X seconds, Y frames, Z cycles, etc.). As shown in FIG. 5C, the attention accumulator 503 associated with the XR object 502 also includes the increase indicator 509 indicating that the current value 531 increased for the time T2 relative to the time T1. In FIG. 5C, the current value 531 breaches or exceeds the first (selection) threshold 501.

As shown in FIG. 5C, the electronic device 120 selects the XR object 502 and changes the appearance of the XR object 502 (e.g., the volumetric cuboid) by presenting a border or frame 522 surrounding the XR object 502 in accordance with a determination that the current value 531 for the attention accumulator 503 associated with the XR object 502 breaches or exceeds the first (selection) threshold 501. One of ordinary skill in the art will appreciate that the manner in which the appearance of the XR object 502 changes to indicate its selection may be different in various other implementations such as a change to the color, texture, brightness, and/or the like of the XR object 502. One of ordinary skill in the art will appreciate that the electronic device 120 may provide other feedback to indicate that the XR object 502 has been selected in various other implementations such as haptic feedback, audible feedback, and/or the like. In some implementations, the electronic device 120 may also perform a function associated with XR object 502 in accordance with a determination that the current value 531 for the attention accumulator 503 associated with the XR object 502 breaches or exceeds the first (selection) threshold 501.

Figure 5D:
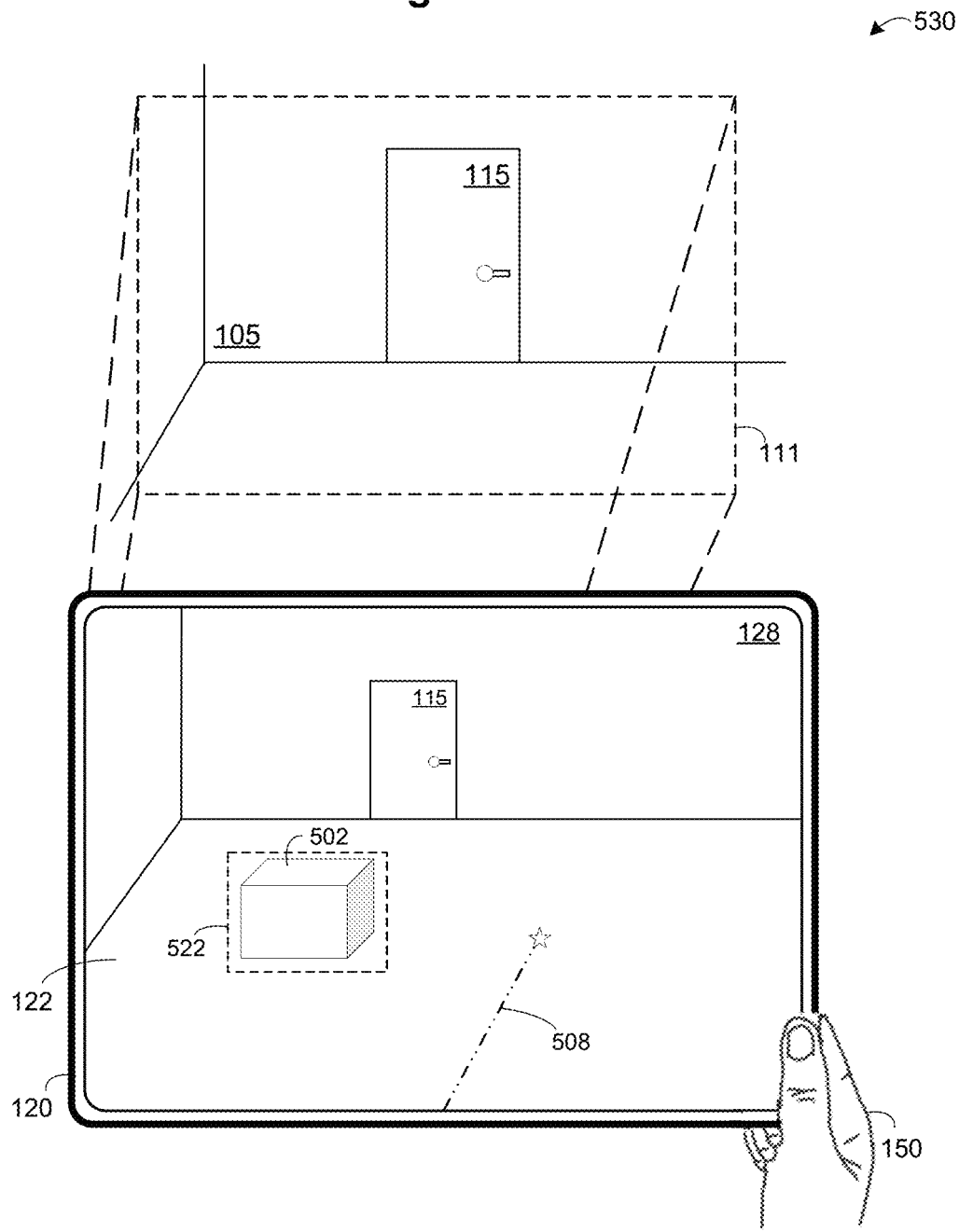

As shown in FIG. 5D, during the instance 530 (e.g., associated with time T3) of the content delivery scenario, the visualization 508 of the gaze direction of the user 150 is no longer directed to the XR object 502. FIG. 5D also illustrates the attention accumulator 503 associated with the XR object 502 including a current value 541 at time T3, which corresponds to a length of time that the gaze direction of the user 150 has been directed to the XR object 502 as of T3 relative to the reference time window (e.g., the past X seconds, Y frames, Z cycles, etc.). As shown in FIG. 5D, the attention accumulator 503 associated with the XR object 502 also includes a decrease indicator 539 indicating that the current value 541 decreased for the time T3 relative to the time T2.

Moreover, in FIG. 5D, the attention accumulator 503 associated with the XR object 502 further includes a second (deselection) threshold 532. In some implementations, in accordance with a determination that the current value for the attention accumulator 503 associated with the XR object 502 breaches or falls under the second (deselection) threshold 532, the electronic device 120 deselects the XR object 502 and changes the appearance of the XR object 502 to indicate its deselection by, for example, removing the border or frame 522 surrounding the XR object 502 as shown in FIG. 5H. In some implementations, in accordance with a determination that the current value for the attention accumulator 503 associated with the XR object 502 does not breach or fall under the second (deselection) threshold 532, the electronic device 120 maintains selection of the XR object 502 and presentation of the border or frame 522 surrounding the XR object 502 to indicate its continued selection as shown in FIGS. 5F and 5G. As shown in FIG. 5D, the current value 541 at time T3 for the attention accumulator 503 associated with the XR object 502 does not breach or fall under the second (deselection) threshold 532. As such, the electronic device 120 maintains selection of the XR object 502 in FIG. 5D.

According to some implementations, the second (deselection) threshold 532 corresponds to a predefined or deterministic value such as a predefined dwell timer. According to some implementations, the second (deselection) threshold 532 corresponds to a non-deterministic value that is dynamically determined or selected based on eye tracking accuracy, current foreground application, XR object classification/type, UI element classification/type, user history, user preferences, and/or the like.

Figure 5E:
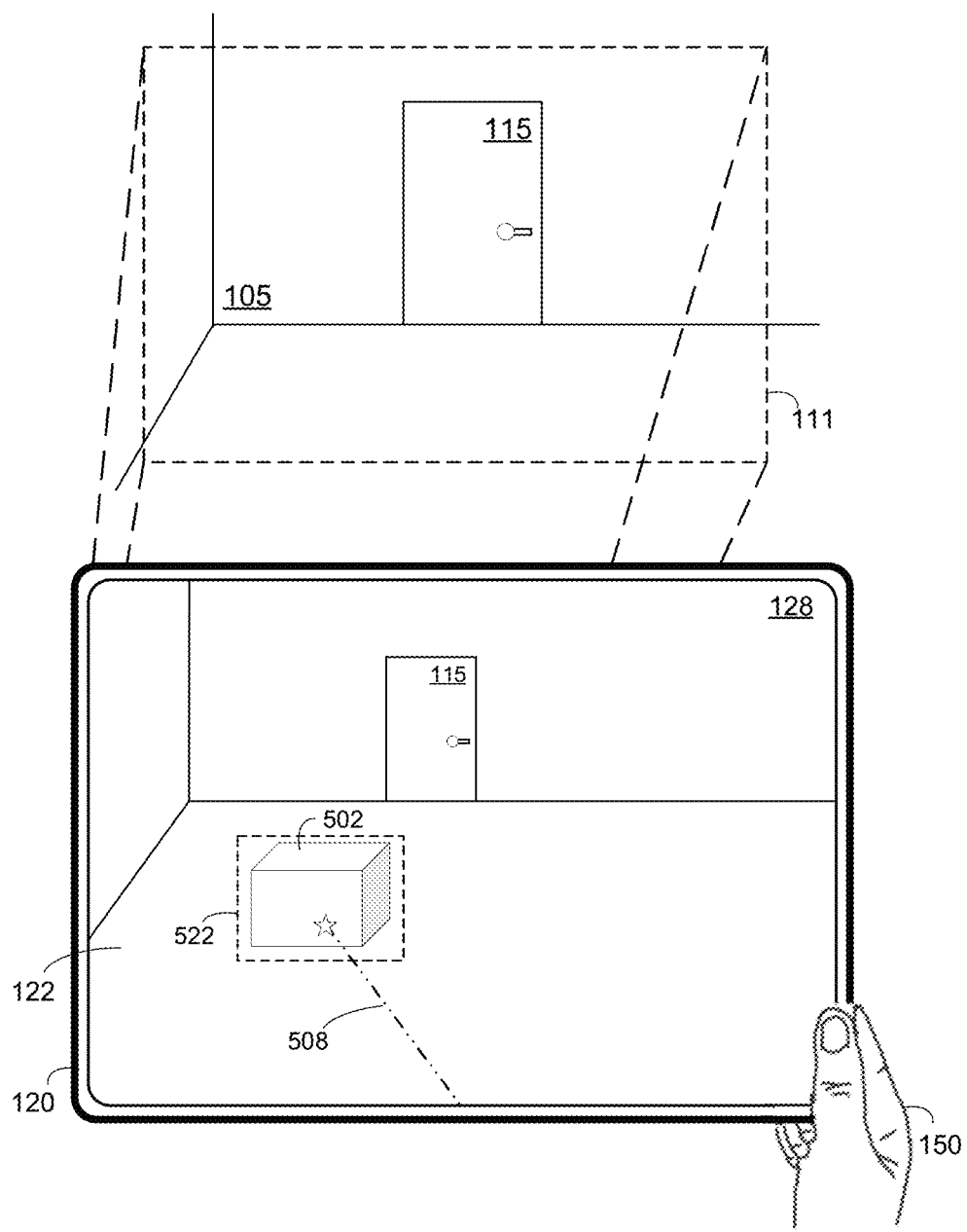
Figure 5E:
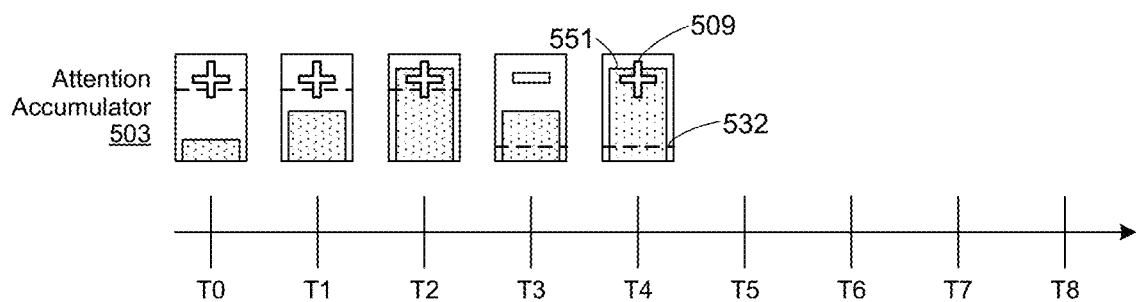
Figure 5F:
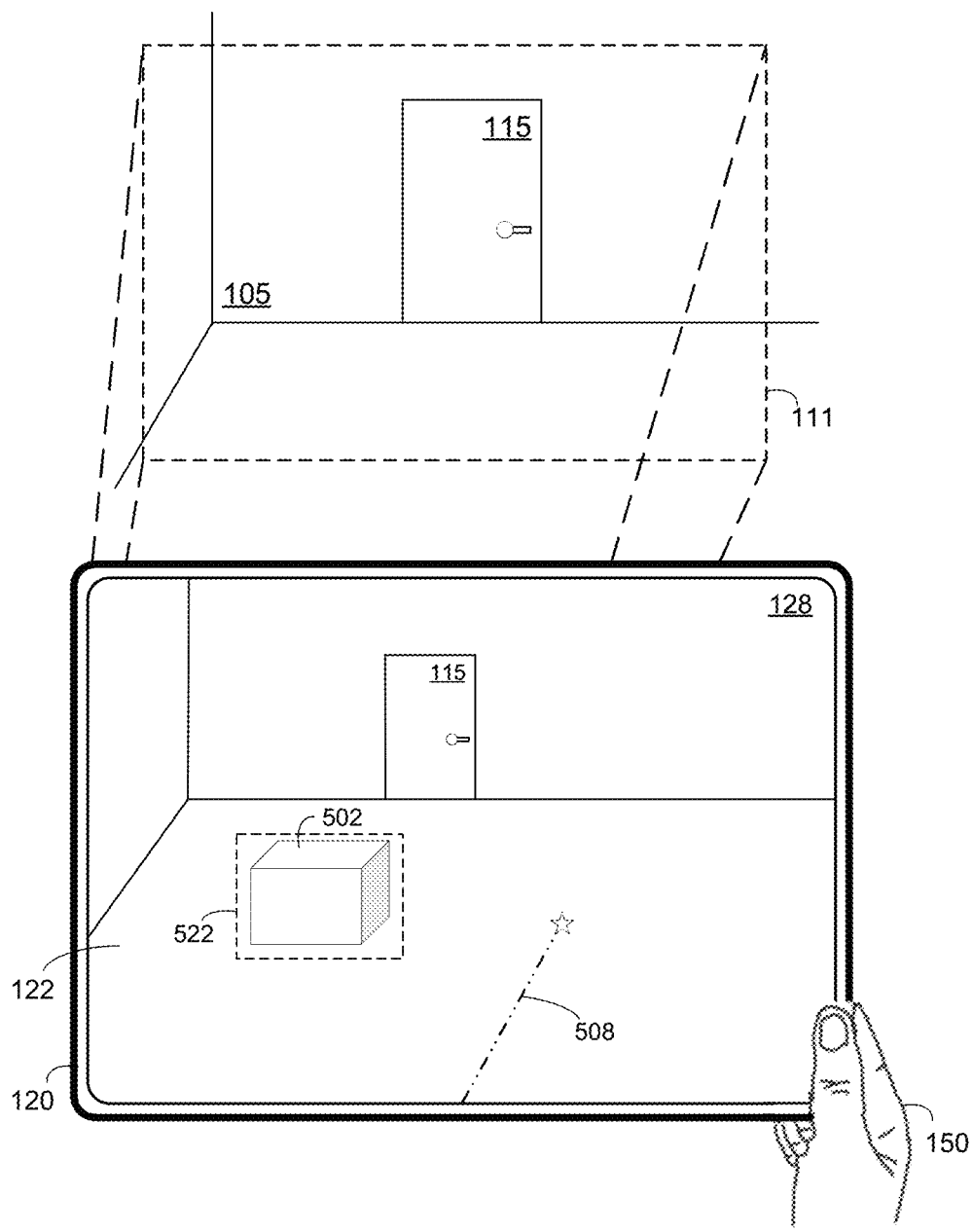
Figure 5G:
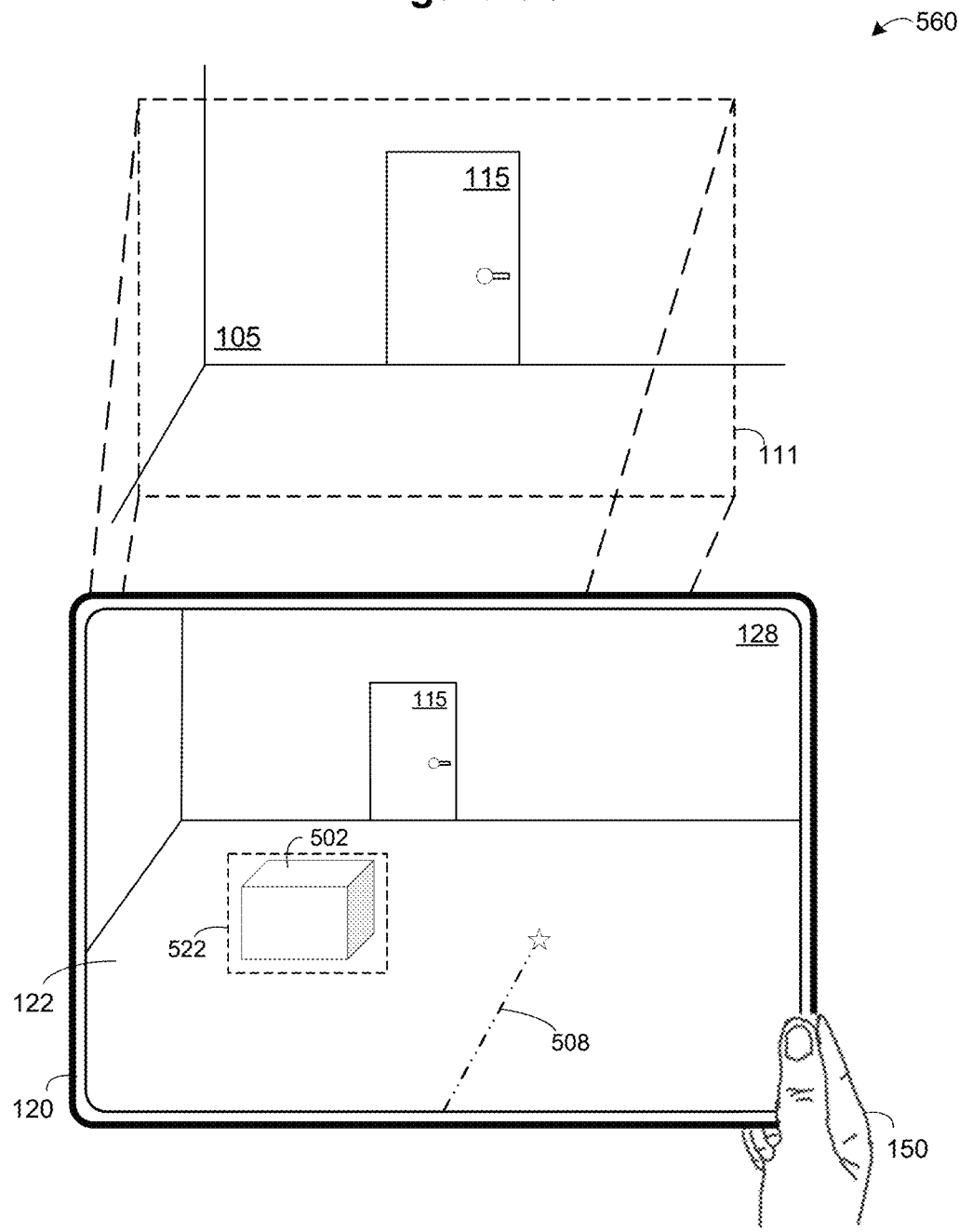
Figure 5H:
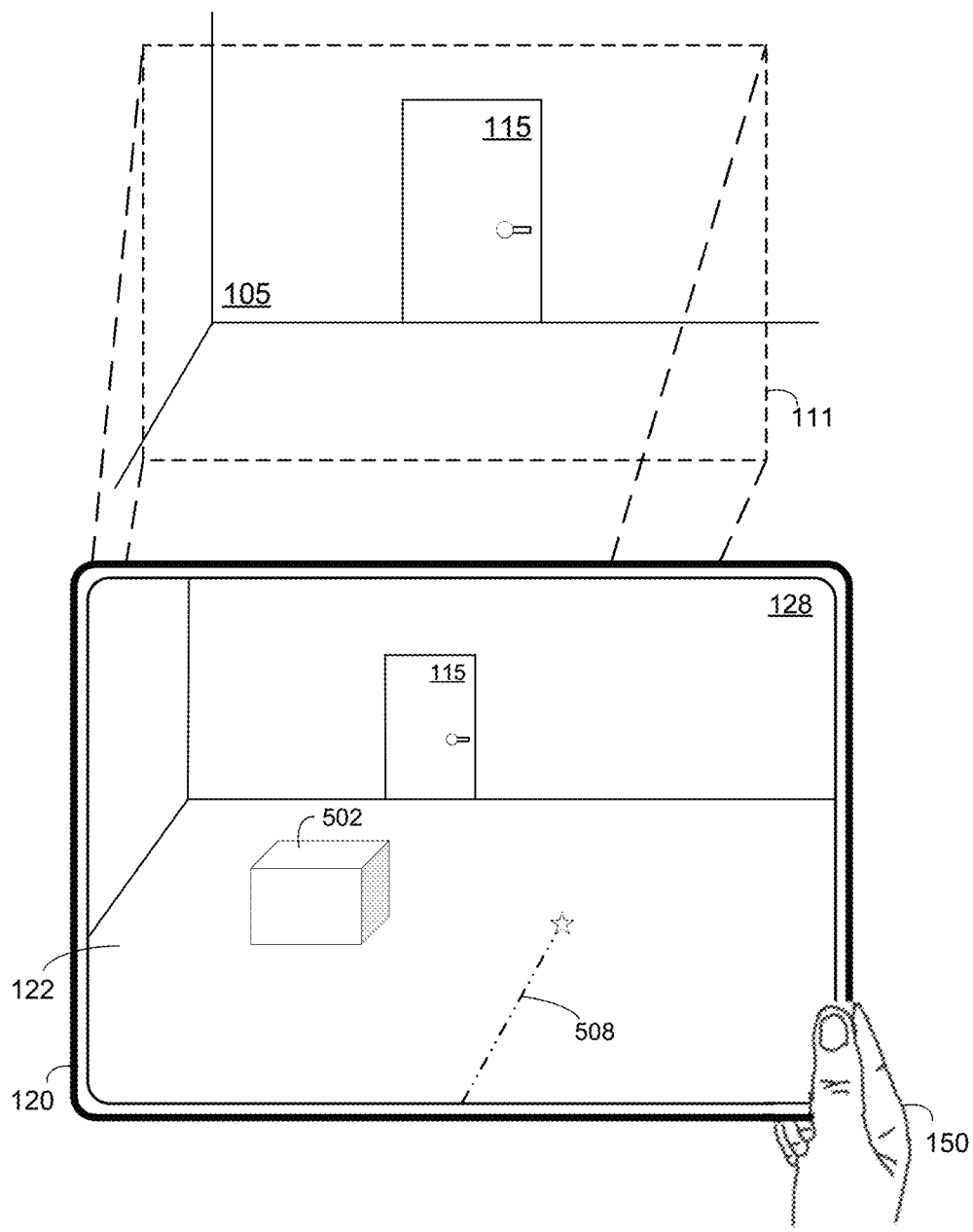
Figure 5H:
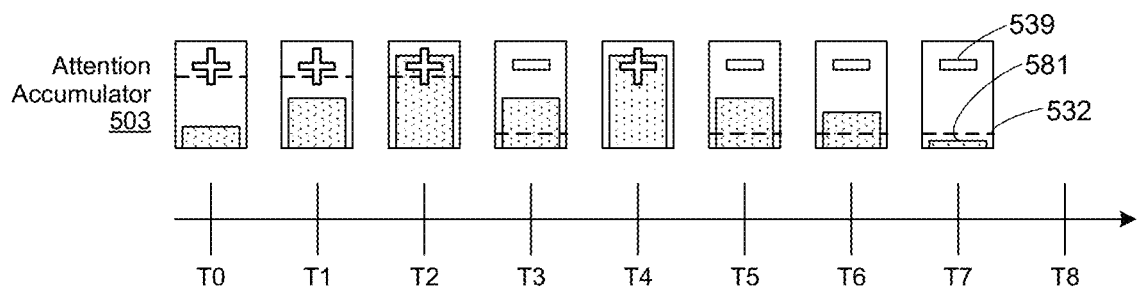

As shown in FIG. 5E, during the instance 540 (e.g., associated with time T4) of the content delivery scenario, the visualization 508 of the gaze direction of the user 150 is again directed to the XR object 502. FIG. 5E also illustrates the attention accumulator 503 associated with the XR object 502 including a current value 551 at time T4, which corresponds to a length of time that the gaze direction of the user 150 has been directed to the XR object 502 as of T4 relative to the reference time window (e.g., the past X seconds, Y frames, Z cycles, etc.). As shown in FIG. 5E, the attention accumulator 503 associated with the XR object 502 also includes the increase indicator 509 indicating that the current value 551 increased for the time T4 relative to the time T3. As shown in FIG. 5E, the current value 551 at time T4 for the attention accumulator 503 associated with the XR object 502 does not breach or fall under the second (deselection) threshold 532. As such, the electronic device 120 maintains selection of the XR object 502 in FIG. 5E.

As shown in FIG. 5F, during the instance 550 (e.g., associated with time T5) of the content delivery scenario, the visualization 508 of the gaze direction of the user 150 is no longer directed to the XR object 502. FIG. 5F also illustrates the attention accumulator 503 associated with the XR object 502 including a current value 561 at time T5, which corresponds to a length of time that the gaze direction of the user 150 has been directed to the XR object 502 as of T5 relative to the reference time window (e.g., the past X seconds, Y frames, Z cycles, etc.). As shown in FIG. 5F, the attention accumulator 503 associated with the XR object 502 also includes the decrease indicator 539 indicating that the current value 561 decreased for the time T5 relative to the time T4. As shown in FIG. 5F, the current value 561 at time T5 for the attention accumulator 503 associated with the XR object 502 does not breach or fall under the second (deselection) threshold 532. As such, the electronic device 120 maintains selection of the XR object 502 in FIG. 5F.

As shown in FIG. 5G, during the instance 560 (e.g., associated with time T6) of the content delivery scenario, the visualization 508 of the gaze direction of the user 150 is not directed to the XR object 502. FIG. 5G also illustrates the attention accumulator 503 associated with the XR object 502 including a current value 571 at time T6, which corresponds to a length of time that the gaze direction of the user 150 has been directed to the XR object 502 as of T6 relative to the reference time window (e.g., the past X seconds, Y frames, Z cycles, etc.). As shown in FIG. 5G, the attention accumulator 503 associated with the XR object 502 also includes the decrease indicator 539 indicating that the current value 571 decreased for the time T6 relative to the time T5. As shown in FIG. 5G, the current value 571 at time T6 for the attention accumulator 503 associated with the XR object 502 does not breach or fall under the second (deselection) threshold 532. As such, the electronic device 120 maintains selection of the XR object 502 in FIG. 5G.

As shown in FIG. 5H, during the instance 570 (e.g., associated with time T7) of the content delivery scenario, the visualization 508 of the gaze direction of the user 150 is not directed to the XR object 502. FIG. 5H also illustrates the attention accumulator 503 associated with the XR object 502 including a current value 581 at time T7, which corresponds to a length of time that the gaze direction of the user 150 has been directed to the XR object 502 as of T7 relative to the reference time window (e.g., the past X seconds, Y frames, Z cycles, etc.). As shown in FIG. 5H, the attention accumulator 503 associated with the XR object 502 also includes the decrease indicator 539 indicating that the current value 581 decreased for the time T7 relative to the time T6.

As shown in FIG. 5H, the current value 581 at time T7 for the attention accumulator 503 associated with the XR object 502 breaches or falls under the second (deselection) threshold 532. As shown in FIG. 5H, the electronic device 120 deselects the XR object 502 and changes the appearance of the XR object 502 (e.g., the volumetric cuboid) by removing the border or frame 522 surrounding the XR object 502 in accordance with a determination that the current value 581 for the attention accumulator 503 associated with the XR object 502 breaches or falls under the second (deselection) threshold 532.

FIGS. 6A-6H illustrate a sequence of instances 600-670 for a content delivery scenario in accordance with some implementations. While certain specific features are illustrated, those skilled in the art will appreciate from the present disclosure that various other features have not been illustrated for the sake of brevity, and so as not to obscure more pertinent aspects of the implementations disclosed herein. FIGS. 6A-6H are similar to and adapted form FIG. 5A-5H. As such, common reference numbers are used in FIGS. 5A-5H and FIGS. 6A-6H and only the differences therebetween will be described for the sake of brevity. To that end, as a non-limiting example, the sequence of instances 600-670 are rendered and presented by a computing system such as the controller 110 shown in FIGS. 1 and 2; the electronic device 120 shown in FIGS. 1 and 3; and/or a suitable combination thereof.

As shown in FIGS. 6A-6H, the content delivery scenario includes a physical environment 105 and an XR environment 128 displayed on the display 122 of the electronic device 120 (e.g., associated with the user 150). The electronic device 120 presents the XR environment 128 to the user 150 while the user 150 is physically present within the physical environment 105 that includes a door 115, which is currently within the FOV 111 of an exterior-facing image sensor of the electronic device 120. As such, in some implementations, the user 150 holds the electronic device 120 in their hand(s) similar to the operating environment 100 in FIG. 1.

In other words, in some implementations, the electronic device 120 is configured to present XR content and to enable optical see-through or video pass-through of at least a portion of the physical environment 105 on the display 122 (e.g., the door 115). For example, the electronic device 120 corresponds to a mobile phone, tablet, laptop, near-eye system, wearable computing device, or the like.

Figure 6A:
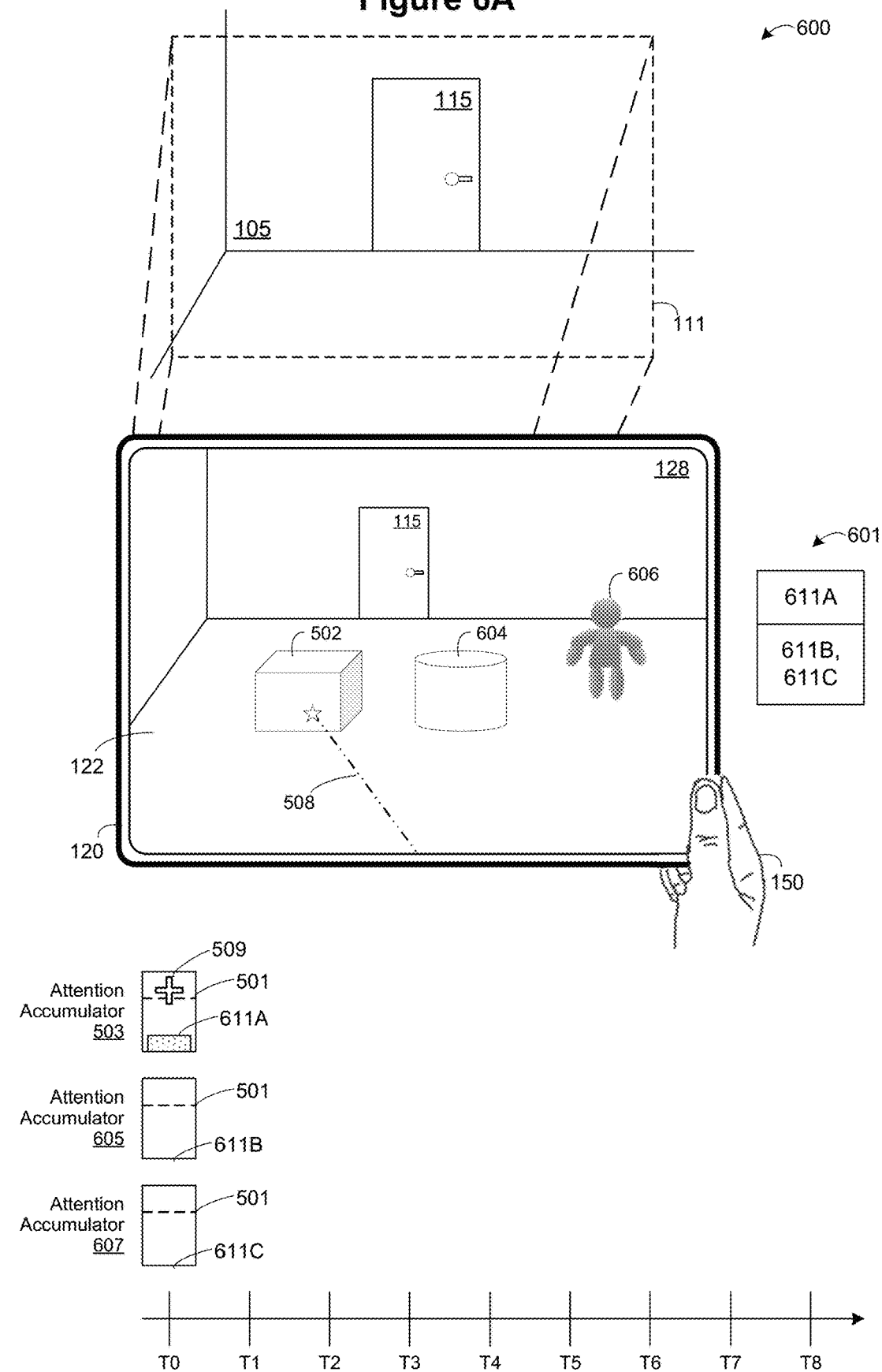
FIGS. 6A-6H illustrate another sequence of instances for a content delivery scenario in accordance with some implementations.

As shown in FIG. 6A, during the instance 600 (e.g., associated with time T0) of the content delivery scenario, the electronic device 120 presents an XR environment 128 including the XR object 502 (e.g., a volumetric cuboid), an XR object 604 (e.g., a volumetric cylinder), and a virtual agent (VA) 606. As shown in FIG. 6A, the XR environment 128 also includes a visualization 508 of the gaze direction or gaze vector of the user 150. According to various implementations, as described above with reference to FIG. 4A, the eye tracking engine 412 may determine and update the gaze direction or the gaze vector 413 over time. One of ordinary skill in the art will appreciate that the visualization 508 may be removed in various implementations or replaced with other forms or configurations in various other implementations. One of ordinary skill in the art will appreciate that the user 150 may interact with the XR object 502, the XR object 604, or the VA 606 within the XR environment 128 in various implementations based on various inputs (e.g., eye tracking inputs, hand/extremity-tracking inputs, voice commands, etc.) such as scaling, translating, rotating, annotating, modifying, etc. the XR object 502, the XR object 604, or the VA 606.

As shown in FIG. 6A, during the instance 600, the visualization 508 of the gaze direction of the user 150 is directed to the XR object 502. FIG. 6A also illustrates an attention accumulator 503 associated with the XR object 502 including a current value 611A at time T0, which corresponds to a length of time that the gaze direction of the user 150 has been directed to the XR object 502 as of T0 relative to a reference time window (e.g., the past X seconds, Y frames, Z cycles, etc.).

FIG. 6A further illustrates an attention accumulator 605 associated with the XR object 604 including a current value 611B (e.g., a null value) and an attention accumulator 607 associated with the VA 606 including a current value 611C (e.g., a null value). FIG. 6A further illustrates a rank-sorted list 601 for the time T0 including the current value 611A for the attention accumulator 503 associated with the XR object 502 ranked above the current value 611B for the attention accumulator 605 associated with the XR object 604 and the current value 611C for the attention accumulator 607 associated with the VA 606. One of ordinary skill in the art will appreciate that the visual representation of attention accumulators 503, 605, and 607, along with list rank-sorted list 601, may be removed in various implementations or replaced with other forms or configurations in various other implementations.

Figure 6B:
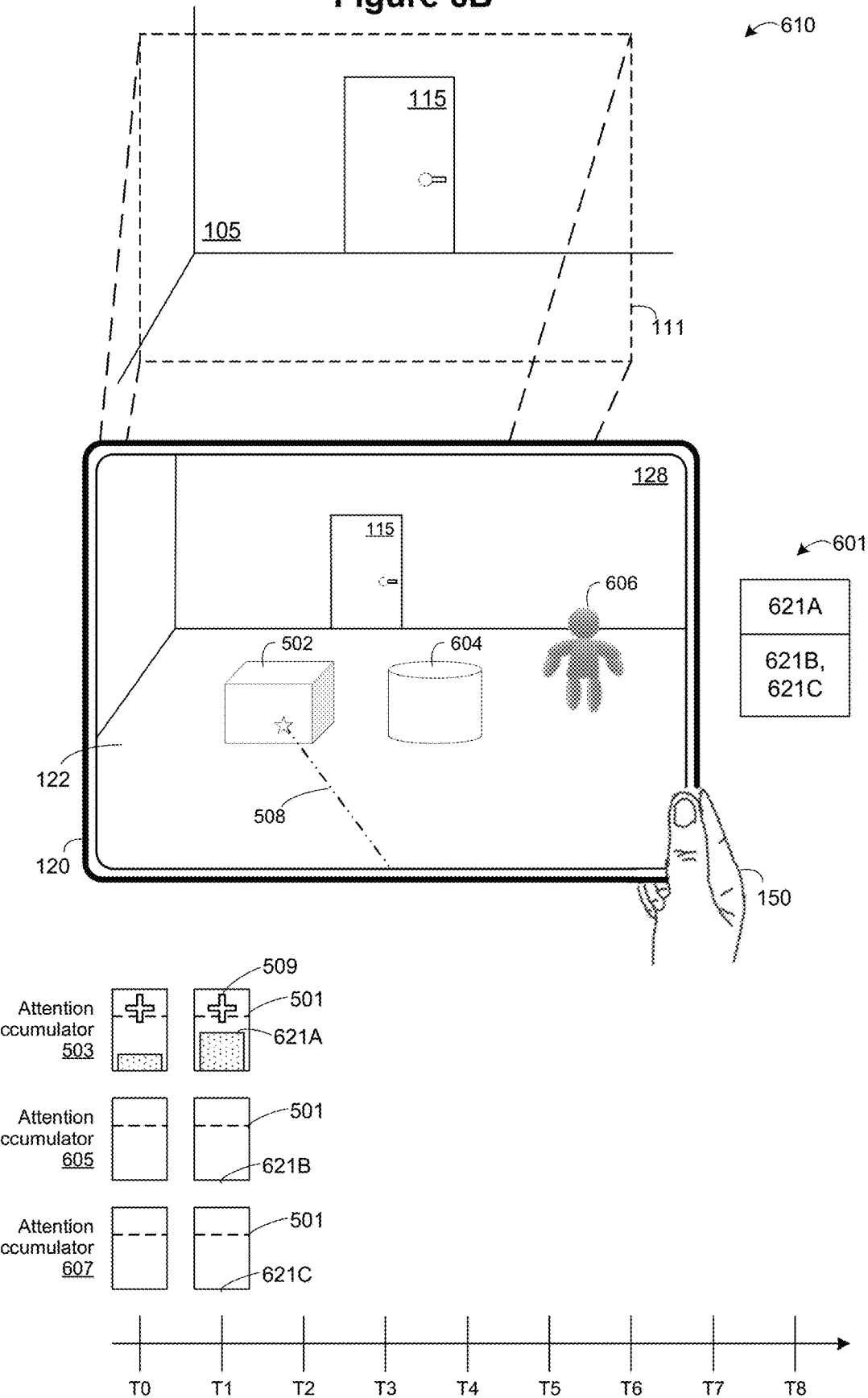
Figure 6C:
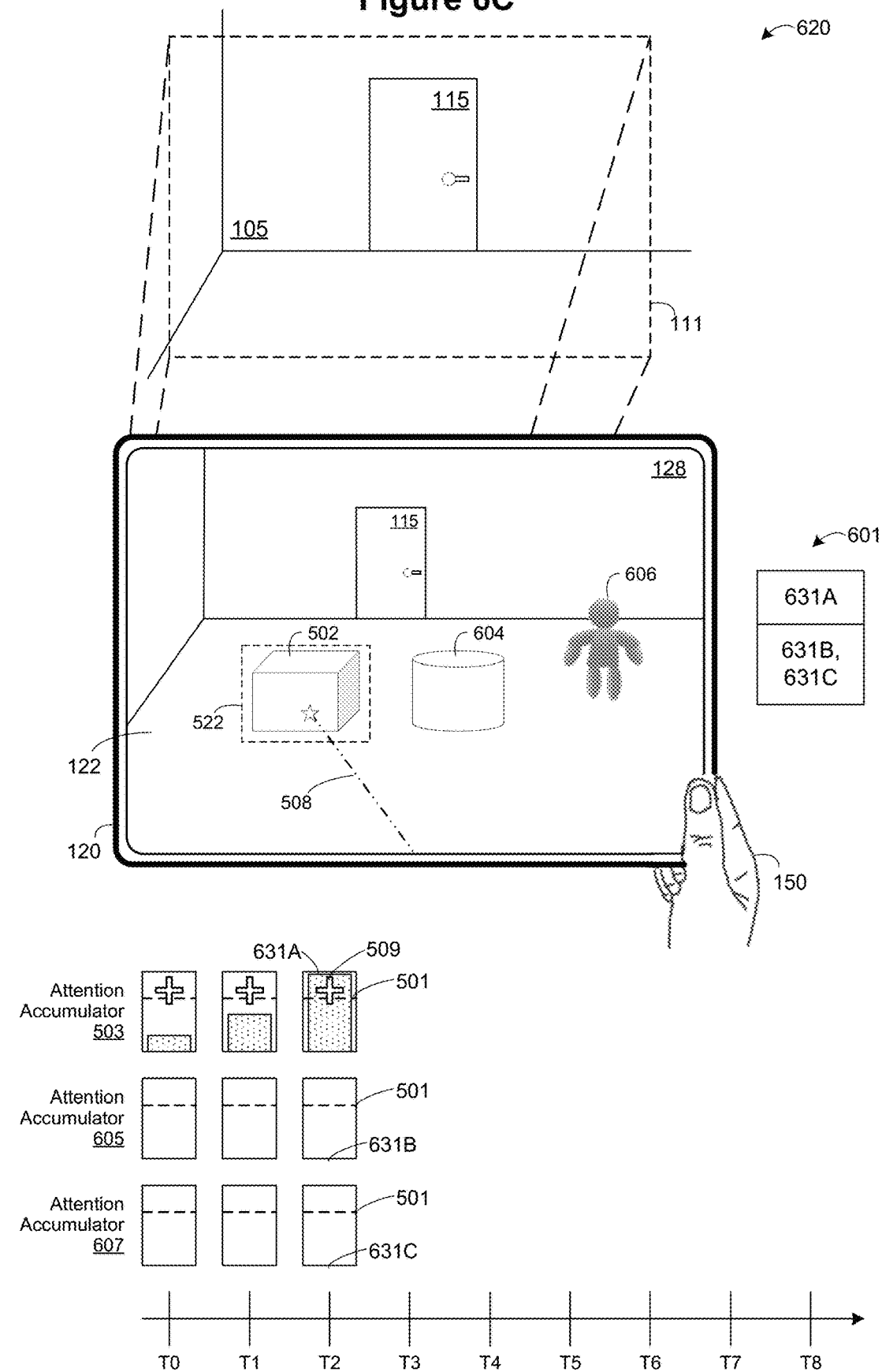

As shown in FIG. 6A, the attention accumulator 503 associated with the XR object 502 includes an increase indicator 509 indicating that the current value 611A for the attention accumulator 503 associated with the XR object 502 increased for the time T0. Moreover, in FIG. 6A, the attention accumulators 503, 605, and 607 further include the first (selection) threshold 501. In some implementations, in accordance with a determination that the current value for the attention accumulator 503 associated with the XR object 502 breaches or exceeds the first (selection) threshold 501, the electronic device 120 selects the XR object 502 as shown in FIG. 6C and changes the appearance of the XR object 502 to indicate that it has been selected such as by presenting a border or frame 522 surrounding the XR object 502 as shown in FIG. 6C. In some implementations, in accordance with a determination that the current value for the attention accumulator 503 associated with the XR object 502 does not breach or exceed the first (selection) threshold 501, the electronic device 120 foregoes selecting the XR object 502 as shown in FIGS. 6A and 6B. In FIG. 6A, the current value 611A does not breach or exceed the first (selection) threshold 501.

As shown in FIG. 6B, during the instance 610 (e.g., associated with time T1) of the content delivery scenario, the visualization 508 of the gaze direction of the user 150 remains directed to the XR object 502. FIG. 6B also illustrates the attention accumulator 503 associated with the XR object 502 including a current value 621A at time T1, which corresponds to a length of time that the gaze direction of the user 150 has been directed to the XR object 502 as of T1 relative to the reference time window (e.g., the past X seconds, Y frames, Z cycles, etc.). As shown in FIG. 6B, the attention accumulator 503 associated with the XR object 502 also includes the increase indicator 509 indicating that the current value 621A increased for the time T1 relative to the time T0. In FIG. 6B, the current value 621A does not breach or exceed the first (selection) threshold 501.

FIG. 6B further illustrates the attention accumulator 605 associated with the XR object 604 including a current value 621B (e.g., the null value) and the attention accumulator 607 associated with the VA 606 including a current value 621C (e.g., the null value). FIG. 6B further illustrates the rank-sorted list 601 for the time T1 including the current value 621A for the attention accumulator 503 associated with the XR object 502 ranked above the current value 621B for the attention accumulator 605 associated with the XR object 604 and the current value 621C for the attention accumulator 607 associated with the VA 606.

As shown in FIG. 6C, during the instance 620 (e.g., associated with time T2) of the content delivery scenario, the visualization 508 of the gaze direction of the user 150 remains directed to the XR object 502. FIG. 6C illustrates the attention accumulator 503 associated with the XR object 502 including a current value 631A at time T2, which corresponds to a length of time that the gaze direction of the user 150 has been directed to the XR object 502 as of T2 relative to the reference time window (e.g., the past X seconds, Y frames, Z cycles, etc.). As shown in FIG. 6C, the attention accumulator 503 associated with the XR object 502 also includes the increase indicator 509 indicating that the current value 631A increased for the time T2 relative to the time T1. In FIG. 6C, the current value 631A breaches or exceeds the first (selection) threshold 501. As shown in FIG. 6C, the electronic device 120 selects the XR object 502 and changes the appearance of the XR object 502 (e.g., the volumetric cuboid) by presenting a border or frame 522 surrounding the XR object 502 in accordance with a determination that the current value 631A for the attention accumulator 503 associated with the XR object 502 breaches or exceeds the first (selection) threshold 501.

FIG. 6C further illustrates the attention accumulator 605 associated with the XR object 604 including a current value 631B (e.g., the null value) and the attention accumulator 607 associated with the VA 606 including a current value 631C (e.g., the null value). FIG. 6C further illustrates the rank-sorted list 601 for the time T2 including the current value 631A for the attention accumulator 503 associated with the XR object 502 ranked above the current value 631B for the attention accumulator 605 associated with the XR object 604 and the current value 631C for the attention accumulator 607 associated with the VA 606.

Figure 6D:
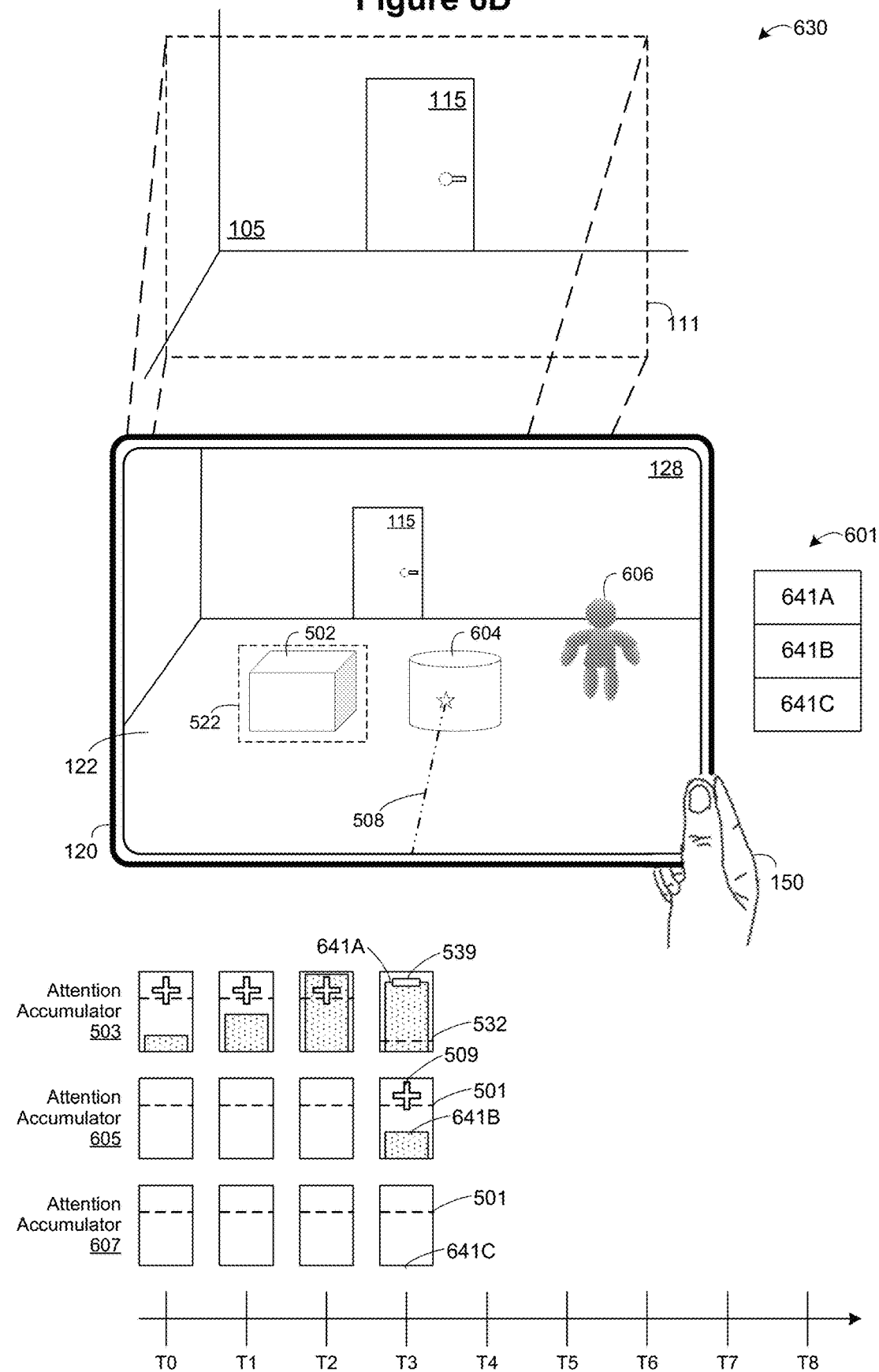

As shown in FIG. 6D, during the instance 630 (e.g., associated with time T3) of the content delivery scenario, the visualization 508 of the gaze direction of the user 150 is no longer directed to the XR object 502 and, instead, is directed to the XR object 604. To this end, FIG. 6D illustrates the attention accumulator 503 associated with the XR object 502 including a current value 641A at time T3, which corresponds to a length of time that the gaze direction of the user 150 has been directed to the XR object 502 as of T3 relative to the reference time window (e.g., the past X seconds, Y frames, Z cycles, etc.). As shown in FIG. 6D, the attention accumulator 503 associated with the XR object 502 also includes the decrease indicator 539 indicating that the current value 641A decreased for the time T3 relative to the time T2.

FIG. 6D also illustrates the attention accumulator 605 associated with the XR object 604 including a current value 641B at time T3, which corresponds to a length of time that the gaze direction of the user 150 has been directed to the XR object 604 as of T3 relative to the reference time window (e.g., the past X seconds, Y frames, Z cycles, etc.). As shown in FIG. 6D, the attention accumulator 605 associated with the XR object 604 also includes the increase indicator 509 indicating that the current value 641B increased for the time T3 relative to the time T2. As shown in FIG. 6D, the current value 641B at time T3 for the attention accumulator 605 associated with the XR object 604 does not breach or exceed the first (selection) threshold 501. FIG. 6D further illustrates the attention accumulator 607 associated with the VA 606 including a current value 641C (e.g., the null value).

FIG. 6D further illustrates the rank-sorted list 601 for the time T3 including the current value 641A for the attention accumulator 503 associated with the XR object 502 ranked above the current value 641B for the attention accumulator 605 associated with the XR object 604, which is ranked above the current value 641C for the attention accumulator 607 associated with the VA 606. As such, the electronic device 120 maintains selection of the XR object 502 in FIG. 6D. Notably, since the attention (e.g., the gaze direction) of the user 150 was directed to XR object 502 for a length of time sufficient to satisfy the first (selection) threshold 501, the electronic device 120 may maintain selection of the XR object 502 despite the gaze direction of the user 150 being momentarily directed to the XR object 604. This advantageously prevents deselection of a virtual object that the user expressed a strong, recent interest in (e.g., represented by the relatively high current value 641A) due to, for example, eye-tracking noise, inadvertent eye movements, or the like.

Figure 6E:
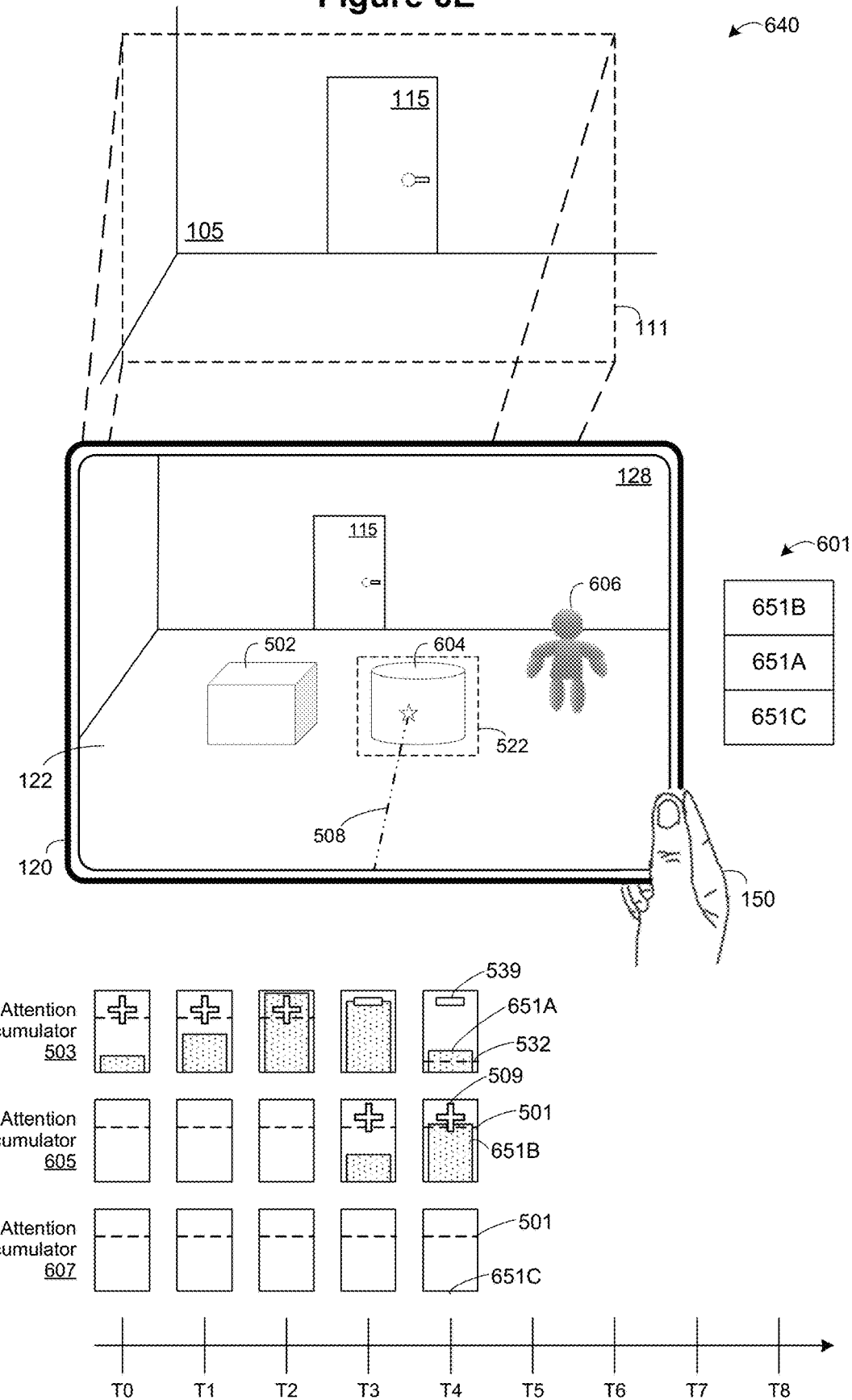

As shown in FIG. 6E during the instance 640 (e.g., associated with time T4) of the content delivery scenario, the visualization 508 of the gaze direction of the user 150 remains directed to the XR object 604. To this end, FIG. 6E illustrates the attention accumulator 503 associated with the XR object 502 including a current value 651A at time T4, which corresponds to a length of time that the gaze direction of the user 150 has been directed to the XR object 502 as of T4 relative to the reference time window (e.g., the past X seconds, Y frames, Z cycles, etc.). As shown in FIG. 6E, the attention accumulator 503 associated with the XR object 502 also includes the decrease indicator 539 indicating that the current value 651A decreased for the time T4 relative to the time T3.

FIG. 6E also illustrates the attention accumulator 605 associated with the XR object 604 including a current value 651B at time T4, which corresponds to a length of time that the gaze direction of the user 150 has been directed to the XR object 604 as of T4 relative to the reference time window (e.g., the past X seconds, Y frames, Z cycles, etc.). As shown in FIG. 6E, the attention accumulator 605 associated with the XR object 604 also includes the increase indicator 509 indicating that the current value 651B increased for the time T4 relative to the time T3. FIG. 6E further illustrates the attention accumulator 607 associated with the VA 606 including a current value 651C (e.g., the null value).

As shown in FIG. 6E, the current value 651B at time T4 for the attention accumulator 605 associated with the XR object 604 is greatest in the rank-sorted list 601 and is also greater than the current value 651A at time T4 for the attention accumulator 503 associated with the XR object 502, and the current value 651B at time T4 for the attention accumulator 605 associated with the XR object 604 breaches or exceeds the first (selection) threshold 501. FIG. 6E further illustrates the rank-sorted list 601 for the time T4 including the current value 651B for the attention accumulator 605 associated with the XR object 604 ranked above the current value 651A for the attention accumulator 503 associated with the XR object 502, which is ranked above the current value 641C for the attention accumulator 607 associated with the VA 606. As such, as shown in FIG. 6E, the electronic device 120 deselects the XR object 502 and selects the XR object 604. Furthermore, the electronic device 120 changes the appearance of the XR object 604 (e.g., the volumetric cuboid) by presenting the border or frame 522 surrounding the XR object 604.

Figure 6F:
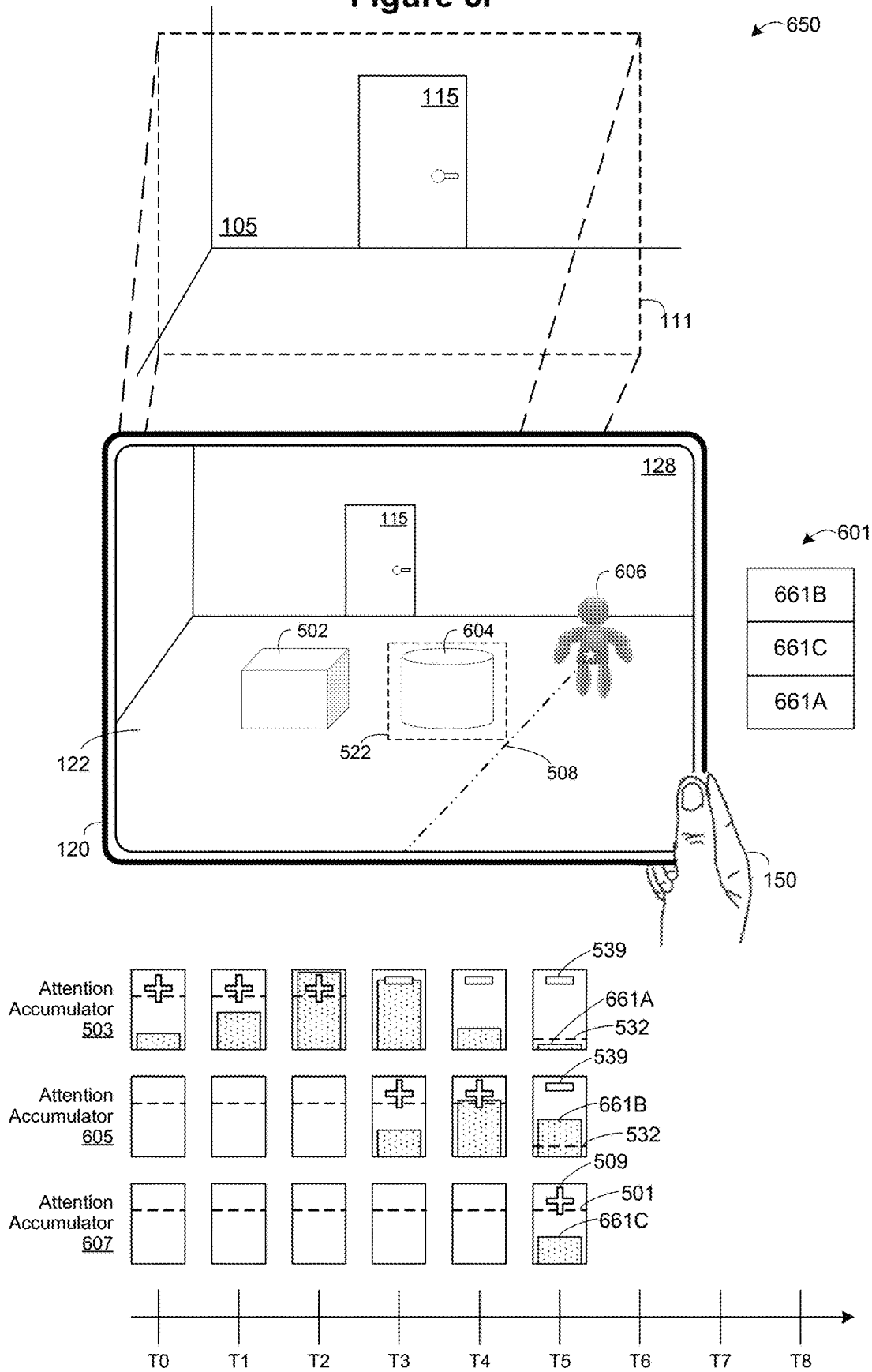

As shown in FIG. 6F, during the instance 650 (e.g., associated with time T5) of the content delivery scenario, the visualization 508 of the gaze direction of the user 150 is no longer directed to the XR object 604 and, instead, is directed to the VA 606. To this end, FIG. 6F illustrates the attention accumulator 503 associated with the XR object 502 including a current value 661A at time T5, which corresponds to a length of time that the gaze direction of the user 150 has been directed to the XR object 502 as of T5 relative to the reference time window (e.g., the past X seconds, Y frames, Z cycles, etc.). As shown in FIG. 6F, the attention accumulator 503 associated with the XR object 502 also includes the decrease indicator 539 indicating that the current value 661A decreased for the time T5 relative to the time T4.

FIG. 6F also illustrates the attention accumulator 605 associated with the XR object 604 including a current value 661B at time T5, which corresponds to a length of time that the gaze direction of the user 150 has been directed to the XR object 604 as of T5 relative to the reference time window (e.g., the past X seconds, Y frames, Z cycles, etc.). As shown in FIG. 6F, the attention accumulator 605 associated with the XR object 604 also includes the decrease indicator 539 indicating that the current value 661B decreased for the time T5 relative to the time T4.

FIG. 6F further illustrates the attention accumulator 607 associated with the VA 606 including a current value 661C at time T5, which corresponds to a length of time that the gaze direction of the user 150 has been directed to the VA 606 as of T5 relative to the reference time window (e.g., the past X seconds, Y frames, Z cycles, etc.). As shown in FIG. 6F, the attention accumulator 607 associated with the VA 606 also includes the increase indicator 509 indicating that the current value 661C increased for the time T5 relative to the time T4. As shown in FIG. 6F, the current value 661C at time T5 for the attention accumulator 607 associated with the VA 606 does not breach or exceed the first (selection) threshold 501.

FIG. 6F further illustrates the rank-sorted list 601 for the time T5 including the current value 661B for the attention accumulator 605 associated with the XR object 604 ranked above the current value 661C for the attention accumulator 607 associated with the VA 606, which is ranked above the current value 661A for the attention accumulator 503 associated with the XR object 502. As such, the electronic device 120 maintains selection of the XR object 604 in FIG. 6F.

Figure 6G:
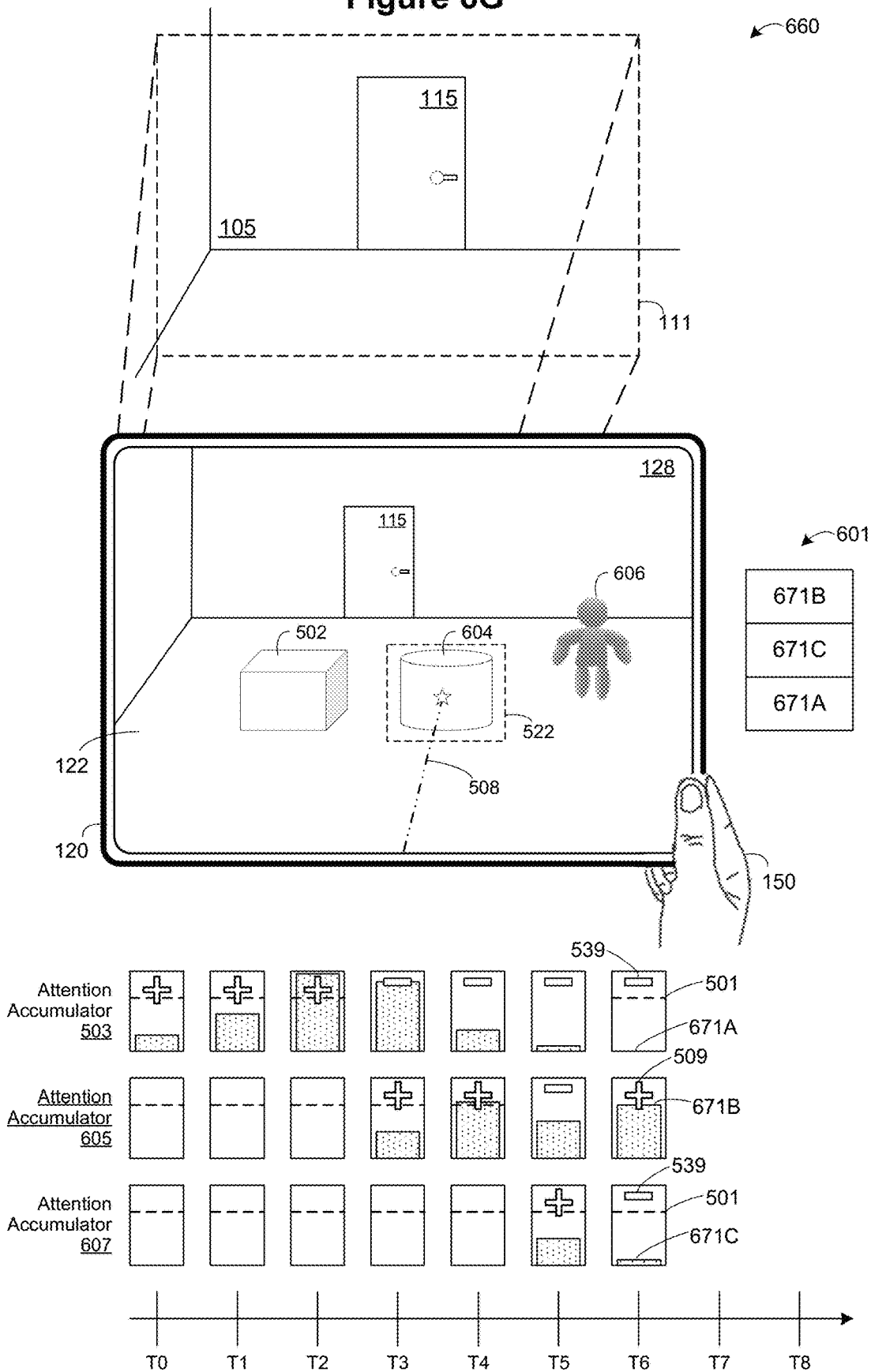

As shown in FIG. 6G, during the instance 660 (e.g., associated with time T6) of the content delivery scenario, the visualization 508 of the gaze direction of the user 150 is no longer directed to the VA 606 and, instead, is directed to the XR object 604. To this end, FIG. 6G illustrates the attention accumulator 503 associated with the XR object 502 including a current value 671A (e.g., a null value) at time T6, which corresponds to a length of time that the gaze direction of the user 150 has been directed to the XR object 502 as of T6 relative to the reference time window (e.g., the past X seconds, Y frames, Z cycles, etc.). As shown in FIG. 6G, the attention accumulator 503 associated with the XR object 502 also includes the decrease indicator 539 indicating that the current value 671A decreased for the time T6 relative to the time T5.

FIG. 6G also illustrates the attention accumulator 605 associated with the XR object 604 including a current value 671B at time T6, which corresponds to a length of time that the gaze direction of the user 150 has been directed to the XR object 604 as of T6 relative to the reference time window (e.g., the past X seconds, Y frames, Z cycles, etc.). As shown in FIG. 6G, the attention accumulator 605 associated with the XR object 604 also includes the increase indicator 509 indicating that the current value 671B increased for the time T6 relative to the time T5.

FIG. 6G further illustrates the attention accumulator 607 associated with the VA 606 including a current value 671C at time T6, which corresponds to a length of time that the gaze direction of the user 150 has been directed to the VA 606 as of T6 relative to the reference time window (e.g., the past X seconds, Y frames, Z cycles, etc.). As shown in FIG. 6G, the attention accumulator 607 associated with the VA 606 also includes the decrease indicator 539 indicating that the current value 671C decreased for the time T6 relative to the time T5.

FIG. 6G further illustrates the rank-sorted list 601 for the time T6 including the current value 671B for the attention accumulator 605 associated with the XR object 604 ranked above the current value 671C for the attention accumulator 607 associated with the VA 606, which is ranked above the current value 671A for the attention accumulator 503 associated with the XR object 502. As such, the electronic device 120 maintains selection of the XR object 604 in FIG. 6G.

Figure 6H:
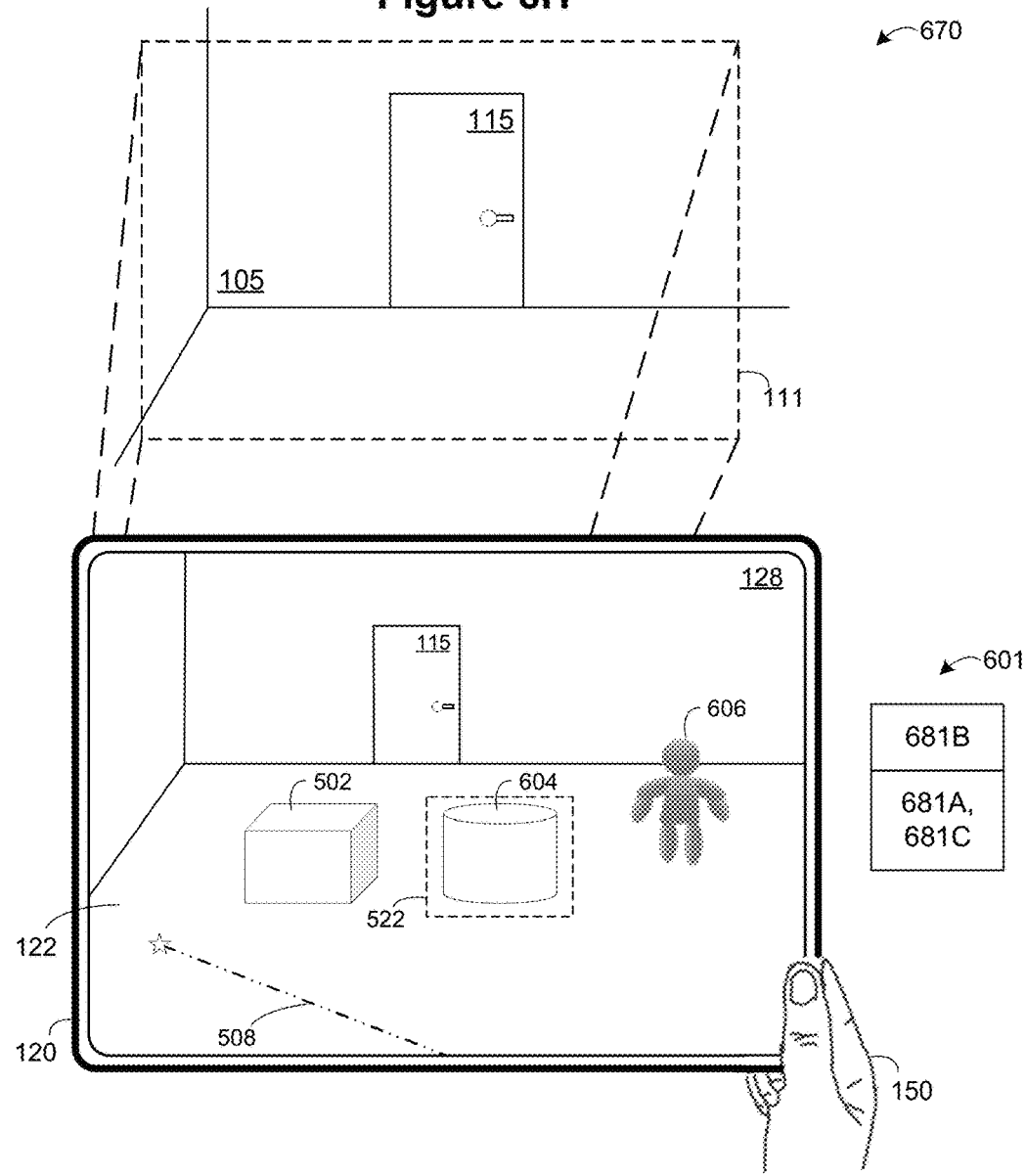
Figure 6H:
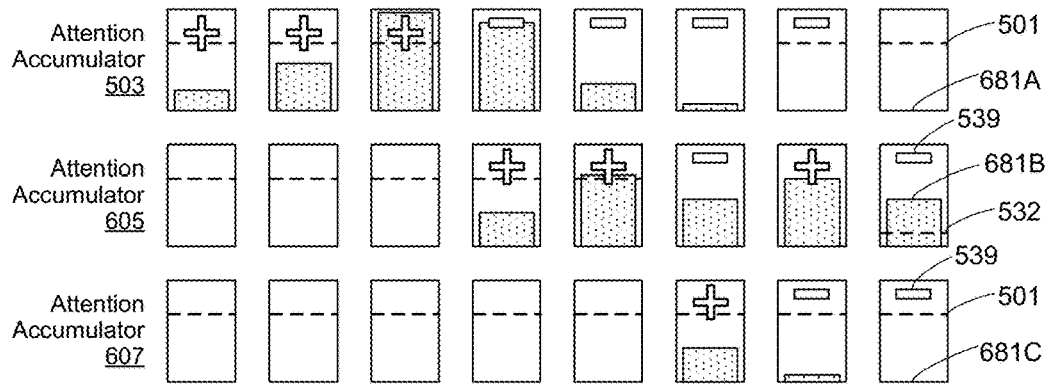
Figure 6H:
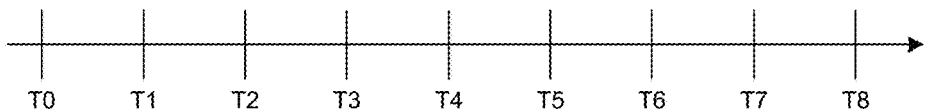

As shown in FIG. 6H, during the instance 670 (e.g., associated with time T7) of the content delivery scenario, the visualization 508 of the gaze direction of the user 150 is no longer directed to the XR object 604. To this end, FIG. 6H illustrates the attention accumulator 503 associated with the XR object 502 including a current value 681A (e.g., the null value) at time T7, which corresponds to a length of time that the gaze direction of the user 150 has been directed to the XR object 502 as of T7 relative to the reference time window (e.g., the past X seconds, Y frames, Z cycles, etc.).

FIG. 6H also illustrates the attention accumulator 605 associated with the XR object 604 including a current value 681B at time T7, which corresponds to a length of time that the gaze direction of the user 150 has been directed to the XR object 604 as of T7 relative to the reference time window (e.g., the past X seconds, Y frames, Z cycles, etc.). As shown in FIG. 6H, the attention accumulator 605 associated with the XR object 604 also includes the decrease indicator 539 indicating that the current value 681B decreased for the time T7 relative to the time T6.

FIG. 6H further illustrates the attention accumulator 607 associated with the VA 606 including a current value 681C (e.g., a null value) at time T7, which corresponds to a length of time that the gaze direction of the user 150 has been directed to the VA 606 as of T7 relative to the reference time window (e.g., the past X seconds, Y frames, Z cycles, etc.). As shown in FIG. 6H, the attention accumulator 607 associated with the VA 606 also includes the decrease indicator 539 indicating that the current value 681C decreased for the time T7 relative to the time T6.

FIG. 6H further illustrates the rank-sorted list 601 for the time T7 including the current value 681B for the attention accumulator 605 associated with the XR object 604 ranked above the current value 681A for the attention accumulator 503 associated with the XR object 502 and the current value 681C for the attention accumulator 607 associated with the VA 606. As such, the electronic device 120 maintains selection of the XR object 604 in FIG. 6H.

While the examples above show attention accumulators having the same first (selection) threshold value 501 and the same second (deselection) threshold value 532, one of ordinary skill in the art will appreciate that, in other implementations, the different attention accumulators can have the same or different first and second threshold values. These values can correspond to predetermined values or non-deterministic values that are dynamically selected or determined based on eye tracking accuracy, current foreground application, UI element types, user history, user preferences, and/or the like. Additionally, in some implementations, the rate at which the value of an accumulator increases can be the same or different than the rate at which it decreases. Moreover, the rates at which the value of an accumulator increase or decrease can be the same or different than those of other accumulators. These values can correspond to predetermined values or non-deterministic values that are dynamically selected or determined based on eye tracking accuracy, current foreground application, UI element types, user history, user preferences, and/or the like.

Figure 7B:
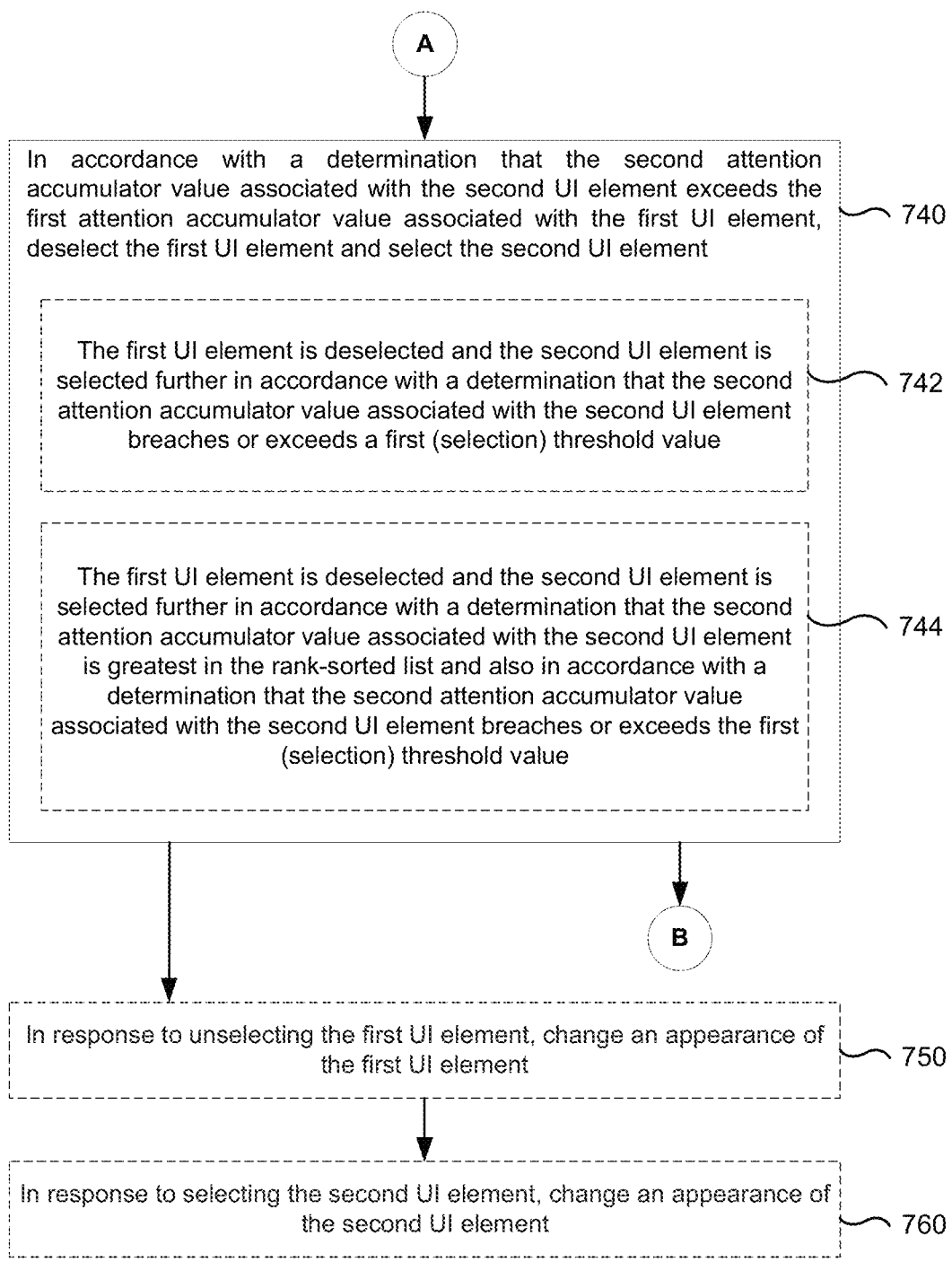
Figure 7C:
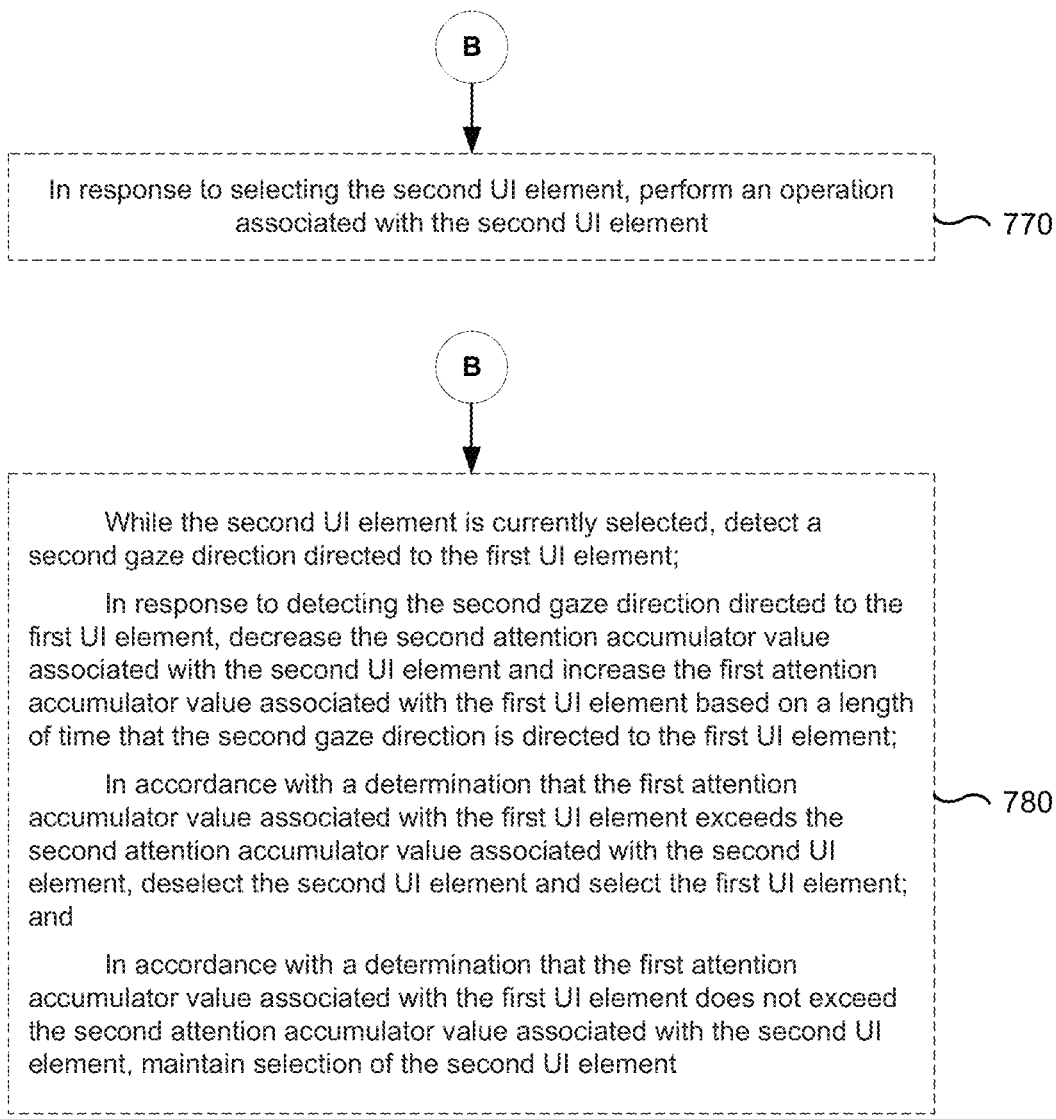

FIGS. 7A-7C illustrate a flowchart representation of a method 700 of selecting a UI element with eye tracking-based attention accumulators with some implementations. In various implementations, the method 700 is performed at a computing system including non-transitory memory and one or more processors, wherein the computing system is communicatively coupled to a display device and one or more input devices (e.g., the electronic device 120 shown in FIGS. 1 and 3; the controller 110 in FIGS. 1 and 2; or a suitable combination thereof). In some implementations, the method 700 is performed by processing logic, including hardware, firmware, software, or a combination thereof. In some implementations, the method 700 is performed by a processor executing code stored in a non-transitory computer-readable medium (e.g., a memory). In some implementations, the computing system corresponds to one of a tablet, a laptop, a mobile phone, a near-eye system, a wearable computing device, or the like. In some implementations, the one or more input devices correspond to a computer vision (CV) engine that uses an image stream from one or more exterior-facing image sensors, a finger/hand/extremity tracking engine, an eye tracking engine, a touch-sensitive surface, one or more microphones, and/or the like.

As discussed above, eye tracking may be noisy and/or inaccurate. Dwell timers may be used to select a UI element with eye tracking inputs. However, the usage of dwell timers to switch between UI elements may cause additional user experience (UX) problems such as discontinuities or jumpiness. In turn, the methods described herein reduce eye tracking noise and improve the overall UX by employing a rank-sorted attention accumulator scheme when selecting UI elements based on eye tracking inputs.

As represented by block 710, while a first user interface (UI) element is currently selected (e.g., in focus), the method 700 includes detecting a first gaze direction directed to a second UI element different from the first UI element. For example, with reference to FIGS. 4A and 4B, the computing device or a portion thereof (e.g., the eye tracking engine 412) obtains (e.g., receives, retrieves, or detects/determines/generates) an eye tracking vector 413 (e.g., the first gaze direction) for the current time period and updates the eye tracking vector 413 over time. For example, with reference to FIG. 4C, the computing device or a portion thereof (e.g., the rendering engine 450) renders a user interface (UI) or an extended reality (XR) environment including the first and second UI elements. As one example, with reference to FIG. 6D, while the XR object 502 (e.g., the first UI element) is currently selected (e.g., as indicated by the border or frame 522 surrounding the XR object 502), the electronic device 120 detects the gaze direction directed to the XR object 604 (e.g., the second UI element).

In some implementations, the display device corresponds to a transparent lens assembly, and wherein presenting the UI or the XR environment includes projecting the UI or the XR environment onto the transparent lens assembly. In some implementations, the display device corresponds to a near-eye system, and wherein presenting the UI or the XR environment includes compositing the UI or the XR environment with one or more images of a physical environment captured by an exterior-facing image sensor.

In some implementations, the appearance of the currently selected UI element is different from deselected UI elements such as a different color, texture, brightness, highlight, and/or the like. In some implementations, a border, a frame, etc. surrounds the currently selected UI element. In some implementations, a spotlight, a shadow, etc. is cast on or about the currently selected UI element.

In some implementations, as represented by block 712, the first and second UI elements correspond to one of a selectable affordance, a selectable button, an interactive (non-binary) UI element (e.g., a dial, slider, etc.), a notification, an extended reality (XR) object, or the like. As one example, with reference to FIGS. 6A-6H, the electronic device 120 presents an XR environment 128 including the XR object 502 (e.g., the first UI element), an XR object 604 (e.g., the second UI element), and the VA 606 (e.g., a third UI element).

As represented by block 720, in response to detecting the first gaze direction directed to the second UI element, the method 700 includes decreasing a first attention accumulator value associated with the first UI element and increasing a second attention accumulator value associated with the second UI element based on a length of time that the first gaze direction is directed to the second UI element. As one example, with reference to FIG. 6D, the attention accumulator 503 associated with the XR object 502 includes a decrease indicator 539 indicating that the current value 641A decreased for the time T3 relative to the time T2, and the attention accumulator 605 associated with the XR object 604 includes an increase indicator 509 indicating that the current value 641B increased for the time T3 relative to the time T2 because the gaze direction in FIG. 6D is no longer directed to the XR object 502 and, instead, is directed to the XR object 604.

In some implementations, as represented by block 722, the first and second attention accumulator values are stored in a rank-sorted list of attention accumulator values. As one example, with reference to FIG. 6D, the rank-sorted list 601 for the time T3 includes the current value 641A for the attention accumulator 503 associated with the XR object 502 ranked above the current value 641B for the attention accumulator 605 associated with the XR object 604, which is ranked above the current value 641C for the attention accumulator 607 associated with the VA 606.

In some implementations, the computing system selects the UI element associated with the highest attention accumulator value in the rank-sorted list. In some implementations, the computing system selects the UI element associated with the highest attention accumulator value in the rank-sorted list as long as the associated attention accumulator value breached the first (selection) threshold within the last N time periods. In some implementations, the attention accumulator values decrease/increase more quickly when multiple attention accumulator values are included in the rank-sorted list as opposed to a single attention accumulator value included in the rank-sorted list. In some implementations, the attention accumulator values decrease/increase more quickly when multiple non-zero attention accumulator values are included in the rank-sorted list as opposed to a single attention accumulator value included in the rank-sorted list.

In some implementations, the computing system determines or modifies the first (selection) threshold and the second (deselection) threshold when multiple attention accumulator values are included in the rank-sorted list as opposed to a single attention accumulator value included in the rank-sorted list. In other words, UI elements may lose selection more quickly when multiple attention accumulator values are included in the rank-sorted list as opposed to a single attention accumulator value included in the rank-sorted list. In one example, while the computing system presents two UI elements within a UI, the attention accumulator values therefor are between 0 and 1.0, the first (selection) threshold corresponds to 0.75, and the second (deselection) threshold correspond to 0.25. Continuing with this example, while the first UI element is currently selected/focused and the attention accumulator value for the second UI element exceeds 0.75, the computing system deselects/unfocuses the first UI element and selects/focuses the second UI element if the attention accumulator value for the second UI element exceeds the attention accumulator value for the first UI element (even if the attention accumulator value for the first UI element exceeds 0.25).

As represented by block 730, in accordance with a determination that the second attention accumulator value associated with the second UI element does not exceed the first attention accumulator value associated with the first UI element, the method 700 includes maintaining selection of the first UI element. As one example, the attention accumulator 503 associated with the XR object 502 decreases from the value 631A in FIG. 6C to the value 641A in FIG. 6D and the attention accumulator 605 associated with the XR object 604 increases from the value 631B in FIG. 6C to the value 641B in FIG. 6D because the gaze direction in FIG. 6D is no longer directed to the XR object 502 and, instead, is directed to the XR object 604. Continuing with this example, as shown by the rank-sorted list 601 for the time T3 in FIG. 6D, the current value 641A for the attention accumulator 503 associated with the XR object 502 is greatest in the rank-sorted list 601 and is also greater than the current value 641B for the attention accumulator 605 associated with the XR object 604. As such, the electronic device 120 maintains selection of the XR object 502 in FIG. 6D.

In some implementations, as represented by block 732, the method 700 maintains selection of the first UI element further in accordance with a determination that the first attention accumulator value associated with the first UI element does not breach or fall below a second (deselection) threshold value. For example, with reference to FIG. 6D, electronic device 120 maintains selection of the XR object 502 after decreasing the attention accumulator 503 associated with the XR object 502 from the value 631A in FIG. 6C to the value 641A in FIG. 6D because the value 641A in FIG. 6D is greater than the second (deselection) threshold value 532 and the value 641A in FIG. 6D is the greatest in the rank-sorted list 601.

In some implementations, the method 700 deselects the first UI element in accordance with a determination that the first attention accumulator value associated with the first LII element breaches or falls below the second (deselection) threshold value. In some implementations, the second (deselection) threshold value corresponds to a predetermined, predefined, or deterministic value. In some implementations, the second (deselection) threshold value corresponds to a non-deterministic value that is dynamically selected or determined based on eye tracking accuracy, current foreground application, UI element types, user history, user preferences, and/or the like.

As represented by block 740, in accordance with a determination that the second attention accumulator value associated with the second UI element exceeds the first attention accumulator value associated with the first UI element, the method 700 includes deselecting the first UI element and selecting the second UI element. In some implementations, the method 700 deselects the first UI element and selects the second UI element further in accordance with a determination that the second attention accumulator value associated with the second UI element breaches or exceeds the first (selection) threshold value. Furthermore, in some implementations, the method 700 deselects the first UI element and selects the second UI element further in accordance with a determination that the second attention accumulator value associated with the second UI element is greatest in the rank-sorted list.

As one example, the attention accumulator 503 associated with the XR object 502 decreases from the value 641A in FIG. 6D to the value 651A in FIG. 6E, and the attention accumulator 605 associated with the XR object 604 increases from the value 641B in FIG. 6D to the value 651B in FIG. 6E because the gaze direction in FIG. 6E remains directed to the XR object 604. Continuing with this example, as shown by the rank-sorted list 601 for the time T3 in FIG. 6E, the current value 651B for the attention accumulator 605 associated with the XR object 604 is greatest in the rank-sorted list 601 and is also greater than the current value 651A for the attention accumulator 503 associated with the XR object 502. Furthermore, the current value 651B for the attention accumulator 605 associated with the XR object 604 breaches or exceeds the first (selection) threshold value 501 in FIG. 6E. As such, as shown in FIG. 6E, the electronic device 120 deselects the XR object 502 and selects the XR object 604. Furthermore, the electronic device 120 changes the appearance of the XR object 604 (e.g., the volumetric cuboid) by presenting the border or frame 522 surrounding the XR object 604.

In some implementations, as represented by block 742, the method 700 deselects the first UI element and selects the second UI element further in accordance with a determination that the second attention accumulator value associated with the second UI element breaches or exceeds the first (selection) threshold value. In this example, the method 700 deselects the first UI element even if the first attention accumulator value associated with the first UI element does not breach or fall below the second (selection) threshold value. For example, with reference to FIG. 6E, the electronic device 120 deselects the XR object 502 (e.g., the first UI element) and selects the XR object 604 (e.g., the second UI element) because the value 651B exceeds or breaches the first (selection) threshold value 501 and the value 651B is greater than the value 651A.

In some implementations, as represented by block 744, the method 700 deselects the first UI element and selects the second UI element further in accordance with a determination that the second attention accumulator value associated with the second UI element breaches or exceeds the first (selection) threshold value and also in accordance with a determination that the second attention accumulator value associated with the second UI element is greatest in a rank-sorted list. Continuing with the above, the method 700 deselects the first UI element even if the first attention accumulator value associated with the first UI element does not breach or fall below the second (selection) threshold value. For example, with reference to FIG. 6E, the electronic device 120 deselects the XR object 502 (e.g., the first UI element) and selects the XR object 604 (e.g., the second UI element) because the value 651B exceeds or breaches the first (selection) threshold value 501 and the value 651B is the greatest in the rank-sorted list 601.

In some implementations, the first (selection) threshold value corresponds to a predetermined, predefined, or deterministic value. In some implementations, the first (selection) threshold value corresponds to a non-deterministic value that is dynamically selected or determined based on eye tracking accuracy, current foreground application, UI element types, user history, user preferences, and/or the like.

In some implementations, the first UI element s deselected after the first attention accumulator value associated with the first UI element s reduced over at least two successive time periods. In some implementations, a respective time period corresponds to a CPU cycle, a frame refresh rate, a deterministic amount of time (e.g., t ms), a non-deterministic amount of time, or the like. As one example, the attention accumulator 503 associated with the XR object 502 decreases in FIGS. 6D and CE because the gaze direction is not directed to the XR object 502 for two successive time periods in FIGS. 6D and 6E.

In some implementations, the second UI element is selected after the second attention accumulator value associated with the second UI element is increased over at least two successive time periods. In some implementations, a respective time period corresponds to a CPU cycle, a frame refresh rate, a deterministic amount of time (e.g., 1 ms), a non-deterministic amount of time, or the like. As one example, the attention accumulator 605 associated with the XR object 604 increases in Figures CD and CE because the gaze direction is directed to the XR object 604 for two successive time periods in FIGS. 6D and 6E.

In some implementations, as represented by block 750, in response to deselecting the first UI element, the method 700 includes changing an appearance of the first UI element. In some implementations, changing the appearance of the first UI element corresponds to changing the color, texture, shape, brightness, etc. of the first UI element. In some implementations, changing the appearance of the first UI element corresponds to removing a border or frame surrounding the first UI element, removing a spotlight on or about the first UI element, removing a shadow on or about the first UI element, presenting a deselection animation, and/or the like. As one example, the computing system changes the appearance of the XR object 502 (e.g., the first UI element) to indicate that the XR object 502 has been deselected between FIGS. 6D and 6E by removing the frame or border 522 surrounding the XR object 502.

In some implementations, as represented by block 760, in response to selecting the second UI element, the method 700 includes changing an appearance of the second UI element. In some implementations, changing the appearance of the second UI element corresponds to changing the color, texture, shape, brightness, etc. of the second UI element. In some implementations, changing the appearance of the second UI element corresponds to presenting a border or frame surrounding the second UI element, presenting a spotlight on or about the second UI element, presenting a shadow on or about the second UI element, presenting a selection animation, and/or the like. As one example, the computing system changes the appearance of the XR object 604 (e.g., the second UI element) to indicate that the XR object 604 has been selected between FIGS. 6D and 6E by presenting the frame or border 522 surrounding the XR object 604.

In some implementations, as represented by block 770, in response to selecting the second UI element, the method 700 includes performing an operation associated with the second UI element. As one example, the computing system may perform an operation (e.g., zooming into, spinning, translating, scaling, etc.) associated with the XR object 604 (e.g., the second UI element) in response to selecting the XR object 604 in FIG. 6E.

In some implementations, as represented by block 780, the method includes: while the second UI element is currently selected (e.g., in focus), detecting a second gaze direction directed to the first UI element; in response to detecting the second gaze direction directed to a first UI element: decreasing the second attention accumulator value associated with the second UI element and increasing the first attention accumulator value associated with the first UI element based on a length of time that the second gaze direction is directed to the first UI element; in accordance with a determination that the first attention accumulator value associated with the first UI element exceeds the second attention accumulator value associated with the second UI element, deselecting the second UI element and selecting the first UI element; and in accordance with a determination that the first attention accumulator value associated with the first UI element does not exceed the second attention accumulator value associated with the second UI element, maintaining selection of the second UI element.

As one example, the attention accumulator 605 associated with the XR object 604 decreases from the value 651B in FIG. 6E to the value 661B in FIG. 6F, and the attention accumulator 607 associated with the VA 606 increases from the value 651C in FIG. 6E to the value 661C in FIG. 6F because the gaze direction in FIG. 6F is no longer directed to the XR object 604 and, instead, is directed to the VA 606. Continuing with this example, as shown by the rank-sorted list 601 for the time T5 in FIG. 6F, the current value 661B for the attention accumulator 605 associated with the XR object 604 is greatest in the rank-sorted list 601 and is also greater than the current value 661C for the attention accumulator 607 associated with the VA 606. As such, the electronic device 120 maintains selection of the XR object 604 in FIG. 6F.

In some implementations, the method 700 includes: while no UI element is currently selected, detecting a second gaze direction directed to the first UI element; in response to detecting the second gaze direction directed to the first UI element, increasing the first attention accumulator value associated with the first UI element based on a length of time that the second gaze direction is directed to the first UI element; in accordance with a determination that the first attention accumulator value associated with the first UI element exceeds a first (selection) threshold value, selecting the first UI element; and in accordance with a determination that the first attention accumulator value associated with the first UI element does not exceed the first (selection) threshold value, forgoing selecting the first UI element.

As one example, with reference to FIGS. 5A and 5B, in accordance with a determination that the current value for the attention accumulator 503 associated with the XR object 502 does not breach or exceed the first (selection) threshold 501, the electronic device 120 foregoes selecting the XR object 502 as shown in FIGS. 5A and 5B. As another example, with reference to FIG. 5C, in accordance with a determination that the current value for the attention accumulator 503 associated with the XR object 502 breaches or exceeds the first (selection) threshold 501, the electronic device 120 selects the XR object 502 as shown in FIG. 5C and changes the appearance of the XR object 502 to indicate that it has been selected such as by presenting a border or frame 522 surrounding the XR object 502 as shown in FIG. 5C.

In some implementations, the method 700 includes: while the first UI element is currently selected, detecting a third gaze direction that is not directed to the first UI element; in response to detecting the third gaze direction that is not directed to the first lit element, decreasing the first attention accumulator value associated with the first UI element based on a length of time that the third gaze direction is not directed to the first UI element; in accordance with a determination that the first attention accumulator value associated with the first UI element falls below a second (deselection) threshold value, deselecting the first UI element; and in accordance with a determination that the first attention accumulator value associated with the first UI element does not fall below the second (deselection) threshold value, maintaining selection of the first UI element.

In some implementations, the first and second threshold values correspond to the same value. In some implementations, the first and second threshold values correspond to different values. In some implementations, at least one of the first and second threshold values are predetermined, predefined, or deterministic values. In some implementations, at least one of the first and second threshold values are non-deterministic values that are dynamically selected or determined based on eye tracking accuracy, current foreground application, UI element types, user history, user preferences, and/or the like. In some implementations, the first and/or second threshold values may dynamically change based on the number of attention accumulator values in the rank-sorted list or the like.

As one example with reference to FIGS. 5F and 5G, in accordance with a determination that the current value for the attention accumulator 503 associated with the XR object 502 does not breach or fall under the second (deselection) threshold 532, the electronic device 120 maintains selection of the XR object 502 and presentation of the border or frame 522 surrounding the XR object 502 to indicate its continued selection as shown in FIGS. 5F and 5G. As another example, with reference to FIG. 5H, in accordance with a determination that the current value for the attention accumulator 503 associated with the XR object 502 breaches or falls under the second (deselection) threshold 532, the electronic device 120 deselects the XR object 502 and changes the appearance of the XR object 502 to indicate its deselection by, for example, removing the border or frame 522 surrounding the XR object 502 as shown in FIG. 5H.

Thus, in some examples, the method 700 may be used to select a single UI element from amongst one or more UI elements in accordance with a determination that its associated attention accumulator value exceeds or breaches a first (selection) threshold value and is the highest attention accumulator value of the one or more UI elements. The method 700 may further be used to deselect a selected UI element in accordance with a determination that its associated attention accumulator value falls below or breaches a second (deselection) threshold value or an attention accumulator value of another UI element both exceeds or breaches the first (selection) threshold value and is the highest attention accumulator value amongst the one or more UI elements.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first media item could be termed a second media item, and, similarly, a second media item could be termed a first media item, which changing the meaning of the description, so long as the occurrences of the "first media item" are renamed consistently and the occurrences of the "second media item" are renamed consistently. The first media item and the second media item are both media items, but they are not the same media item.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a computing system including non-transitory memory and one or more processors, wherein the computing system is communicatively coupled to a display device and one or more input devices via a communication interface:
while a first user interface (UI) element is currently selected, detecting a first gaze direction directed to a second UI element different from the first UI element;
in response to detecting the first gaze direction directed to the second UI element, decreasing a first attention accumulator value associated with the first UI element and increasing a second attention accumulator value associated with the second UI element based on a length of time that the first gaze direction is directed to the second UI element;
in accordance with a determination that the second attention accumulator value associated with the second UI element exceeds the first attention accumulator value associated with the first UI element, deselecting the first UI element and selecting the second UI element; and
in accordance with a determination that the second attention accumulator value associated with the second UI element does not exceed the first attention accumulator value associated with the first UI element, maintaining selection of the first UI element.

2. The method of claim 1, wherein selection of the first UI element is maintained in accordance with a determination that the second attention accumulator value associated with the second UI element does not exceed the first attention accumulator value associated with the first UI element and further in accordance with a determination that the first attention accumulator value associated with the first UI element does not breach or fall below a second threshold value.

3. The method of claim 1, wherein the first UI element is deselected and the second UI element is selected in accordance with a determination that the second attention accumulator value associated with the second UI element exceeds the first attention accumulator value associated with the first UI element and further in accordance with a determination that the second attention accumulator value associated with the second UI element breaches or exceeds a first threshold value and also in accordance with a determination that the second attention accumulator value associated with the second UI element is greatest in a rank-sorted list of attention accumulator values including at least the first and second attention accumulator values.

4. The method of claim 1, wherein the first UI element is deselected after the first attention accumulator value associated with the first UI element is reduced over at least two successive time periods, and wherein the second UI element is selected after the second attention accumulator value associated with the second UI element is increased over at least two successive time periods.

5. The method of claim 1, wherein the first and second UI elements correspond to one of a selectable affordance, a selectable button, an interactive UI element, a notification, or an extended reality (XR) object.

6. The method of claim 1, further comprising:
in response to deselecting the first UI element, changing an appearance of the first UI element; and
in response to selecting the second UI element, changing an appearance of the second UI element or performing an operation associated with the second UI element.

7. The method of claim 1, further comprising:
While the second UI element is currently selected, detecting a second gaze direction directed to the first UI element;
in response to detecting the second gaze direction directed to the first UI element, decreasing the second attention accumulator value associated with the second UI element and increasing the first attention accumulator value associated with the first UI element based on a length of time that the second gaze direction is directed to the first UI element;
in accordance with a determination that the first attention accumulator value associated with the first UI element exceeds the second attention accumulator value associated with the second UI element, deselecting the second UI element and selecting the first UI element; and
in accordance with a determination that the first attention accumulator value associated with the first UI element does not exceed the second attention accumulator value associated with the second UI element, maintaining selection of the second UI element.

8. The method of claim 1, further comprising:
while no UI element is currently selected, detecting a second gaze direction directed to the first UI element;
in response to detecting the second gaze direction directed to the first UI element, increasing the first attention accumulator value associated with the first UI element based on a length of time that the second gaze direction is directed to the first UI element;
in accordance with a determination that the first attention accumulator value associated with the first UI element exceeds a first threshold value, selecting the first UI element; and
in accordance with a determination that the first attention accumulator value associated with the first UI element does not exceed the first threshold value, forgoing selecting the first UI element.

9. The method of claim 8, further comprising:
while the first UI element is currently selected, detecting a third gaze direction that is not directed to the first UI element;
in response to detecting the third gaze direction that is not directed to the first UI element, decreasing the first attention accumulator value associated with the first UI element based on a length of time that the third gaze direction is not directed to the first UI element;
in accordance with a determination that the first attention accumulator value associated with the first UI element falls below a second threshold value, deselecting the first UI element; and
in accordance with a determination that the first attention accumulator value associated with the first UI element does not fall below the second threshold value, maintaining selection of the first UI element.

10. A device comprising:
one or more processors;
a non-transitory memory;
an interface for communicating with a display device and one or more input devices; and
one or more programs stored in the non-transitory memory, which, when executed by the one or more processors, cause the device to:
while a first user interface (UI) element is currently selected, detect a first gaze direction directed to a second UI element different from the first UI element;
in response to detecting the first gaze direction directed to the second UI element, decrease a first attention accumulator value associated with the first UI element and increase a second attention accumulator value associated with the second UI element based on a length of time that the first gaze direction is directed to the second UI element;
in accordance with a determination that the second attention accumulator value associated with the second UI element exceeds the first attention accumulator value associated with the first UI element, deselect the first UI element and selecting the second UI element; and
in accordance with a determination that the second attention accumulator value associated with the second UI element does not exceed the first attention accumulator value associated with the first UI element, maintain selection of the first UI element.

11. The device of claim 10, wherein selection of the first UI element is maintained in accordance with a determination that the second attention accumulator value associated with the second UI element does not exceed the first attention accumulator value associated with the first UI element and further in accordance with a determination that the first attention accumulator value associated with the first UI element does not breach or fall below a second threshold value.

12. The device of claim 10, wherein the first UI element is deselected and the second UI element is selected in accordance with a determination that the second attention accumulator value associated with the second UI element exceeds the first attention accumulator value associated with the first UI element and further in accordance with a determination that the second attention accumulator value associated with the second UI element breaches or exceeds a first threshold value and also in accordance with a determination that the second attention accumulator value associated with the second UI element is greatest in a rank-sorted list of attention accumulator values including at least the first and second attention accumulator values.

13. The device of claim 10, wherein the first UI element is deselected after the first attention accumulator value associated with the first UI element is reduced over at least two successive time periods, and wherein the second UI element is selected after the second attention accumulator value associated with the second UI element is increased over at least two successive time periods.

14. The device of claim 10, wherein the first and second UI elements correspond to one of a selectable affordance, a selectable button, an interactive UI element, a notification, or an extended reality (XR) object.

15. The device of claim 10, wherein the one or more programs further cause the device to:
   in response to deselecting the first UI element, change an appearance of the first UI element; and
   in response to selecting the second UI element, change an appearance of the second UI element or perform an operation associated with the second UI element.

16. A non-transitory memory storing one or more programs, which, when executed by one or more processors of a device with an interface for communicating with a display device and one or more input devices, cause the device to:
   while a first user interface (UI) element is currently selected, detect a first gaze direction directed to a second UI element different from the first UI element;
   in response to detecting the first gaze direction directed to the second UI element, decrease a first attention accumulator value associated with the first UI element and increase a second attention accumulator value associated with the second UI element based on a length of time that the first gaze direction is directed to the second UI element;
   in accordance with a determination that the second attention accumulator value associated with the second UI element exceeds the first attention accumulator value associated with the first UI element, deselect the first UI element and selecting the second UI element; and
   in accordance with a determination that the second attention accumulator value associated with the second UI element does not exceed the first attention accumulator value associated with the first UI element, maintain selection of the first UI element.

17. The non-transitory memory of claim 16, wherein selection of the first UI element is maintained in accordance with a determination that the second attention accumulator value associated with the second UI element does not exceed the first attention accumulator value associated with the first UI element and further in accordance with a determination that the first attention accumulator value associated with the first UI element does not breach or fall below a second threshold value.

18. The non-transitory memory of claim 16, wherein the first UI element is deselected and the second UI element is selected in accordance with a determination that the second attention accumulator value associated with the second UI element exceeds the first attention accumulator value associated with the first UI element and further in accordance with a determination that the second attention accumulator value associated with the second UI element breaches or exceeds a first threshold value and also in accordance with a determination that the second attention accumulator value associated with the second UI element is greatest in a rank-sorted list of attention accumulator values including at least the first and second attention accumulator values.

19. The non-transitory memory of claim 16, wherein the first UI element is deselected after the first attention accumulator value associated with the first UI element is reduced over at least two successive time periods, and wherein the second UI element is selected after the second attention accumulator value associated with the second UI element is increased over at least two successive time periods.

20. The non-transitory memory of claim 16, wherein the first and second UI elements correspond to one of a selectable affordance, a selectable button, an interactive UI element, a notification, or an extended reality (XR) object.

21. The non-transitory memory of claim 16, wherein the one or more programs further cause the device to:
   in response to deselecting the first UI element, change an appearance of the first UI element; and
   in response to selecting the second UI element, change an appearance of the second UI element or perform an operation associated with the second UI element.

* * * * *